United States Patent [19]
Ogata et al.

[11] Patent Number: 5,696,742
[45] Date of Patent: Dec. 9, 1997

[54] OPTICAL DISK DEVICE FOR REPRODUCING ADDRESS INFORMATION FROM WOBBLED GROOVE

[75] Inventors: Nobuo Ogata, Shiki-gun; Yasuo Nakata, Takaichi-gun; Yoshihiro Sekimoto, Soraku-gun; Kunio Kojima, Nabari; Hideaki Sato, Yamatokoriyama, all of Japan

[73] Assignee: Sharp Kabushiki Kaisha, Osaka, Japan

[21] Appl. No.: 637,829

[22] Filed: Apr. 25, 1996

[30] Foreign Application Priority Data

May 23, 1995 [JP] Japan .................. 7-123571

[51] Int. Cl.$^6$ .................................. G11B 7/085
[52] U.S. Cl. .................. 369/32; 369/47; 369/54
[58] Field of Search .................. 369/44.13, 44.26, 369/44.34, 54, 47, 124, 275.4, 32, 44.28

[56] References Cited

U.S. PATENT DOCUMENTS

| | | | |
|---|---|---|---|
| 4,375,088 | 2/1983 | De Hoan et al. | 369/44.13 |
| 5,121,375 | 6/1992 | Kuribayashi | 369/44.26 |
| 5,185,732 | 2/1993 | Ogawa et al. | 369/275.4 |
| 5,339,302 | 8/1994 | Takahashi et al. | 369/54 |
| 5,615,185 | 3/1997 | Horikiri | 369/44.13 |

FOREIGN PATENT DOCUMENTS

| | | |
|---|---|---|
| 0 442 566 A1 | 8/1991 | European Pat. Off. . |
| 0 580 419 A3 | 1/1994 | European Pat. Off. . |
| 0 623 921 A1 | 11/1994 | European Pat. Off. . |
| 4-27610 | 5/1992 | Japan . |
| 5-314538 | 11/1993 | Japan . |

*Primary Examiner*—Thang V. Tran
*Attorney, Agent, or Firm*—David G. Conlin; George W. Neuner

[57] ABSTRACT

A light sensor is divided into two light receiving sections which receive light reflected by an optical disk. A first intermediate address signal is generated from a difference signal of outputs of the light receiving sections. A second intermediate address signal is generated from a sum signal of outputs of the light receiving sections. An address generating circuit generates an address signal by using the first and second intermediate address signals. An optical disk device stably generating an address signal regardless of a displacement of an objective lens and a change in reflectance of the optical disk is thus provided.

12 Claims, 19 Drawing Sheets

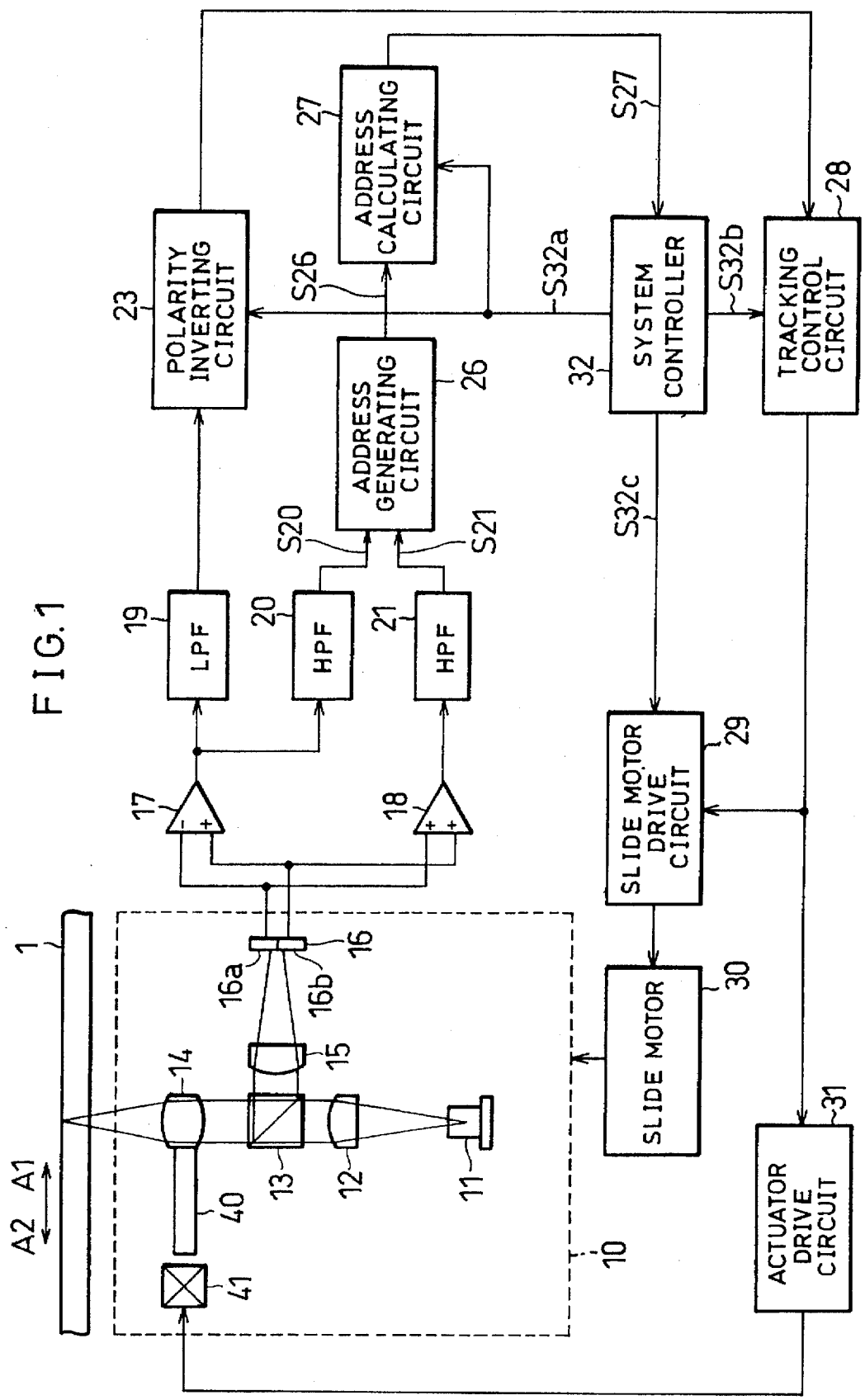

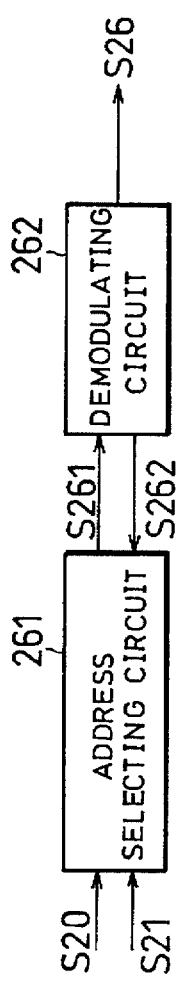
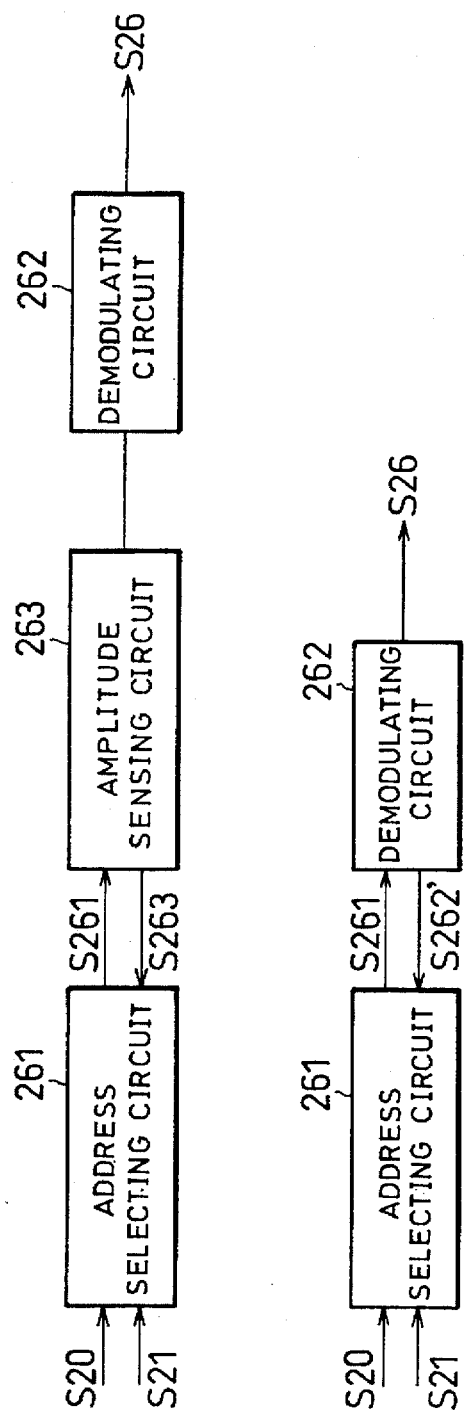
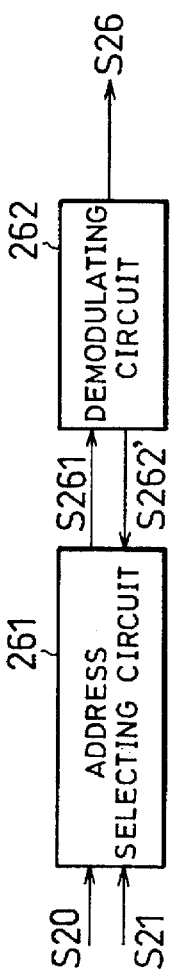
FIG.4(a)
FIG.4(b)
FIG.4(c)

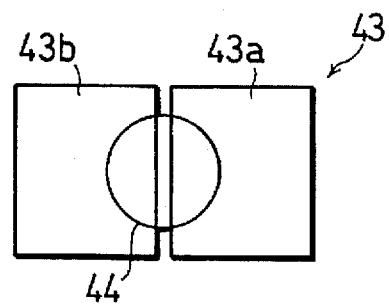
FIG.6(a)
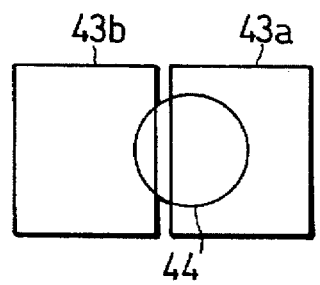
FIG.6(b)
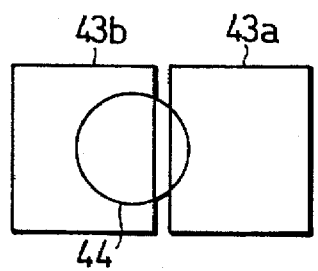
FIG.6(c)
FIG.7
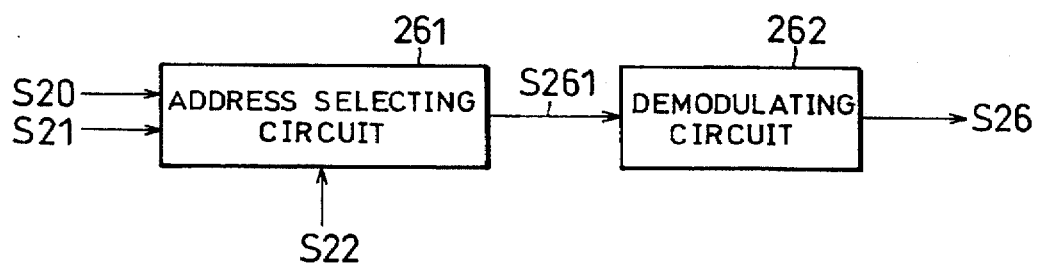

F I G.13(a)
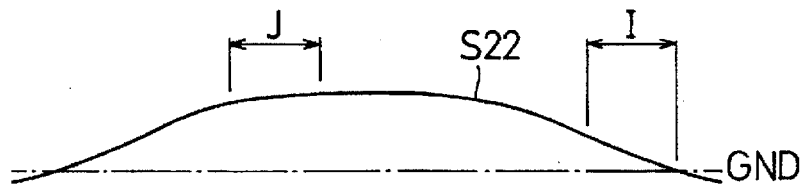
F I G.13(b)
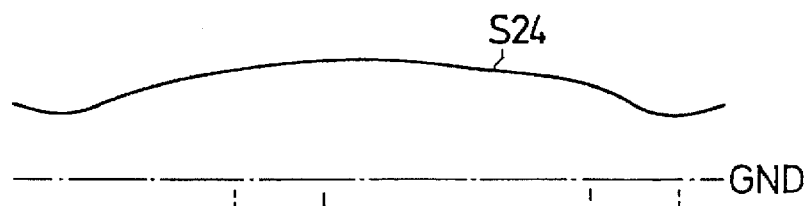
F I G.13(c)
F I G.13(d)

OPTICAL DISK DEVICE FOR REPRODUCING ADDRESS INFORMATION FROM WOBBLED GROOVE

FIELD OF THE INVENTION

The present invention relates to an optical disk device for recording/reproducing/erasing information on both the groove and the land of an optical disk with a laser beam, and more particularly to an optical disk device capable of reducing errors in generating address signals and controlling the position of a light spot in accordance with the address signals.

BACKGROUND OF THE INVENTION

FIG. 14 shows a structure generally employed in a conventional recording and reproducing optical disk. An optical disk 101 includes, on the back surface 2a thereof, a substrate 2 having a groove 3 and a land 4. The groove 3 is a concave part provided by dry etching or a similar technique; the land 4 is a convex part left unetched between the groove 3. A pair of the groove 3 and the land 4 composes a guide track 5. A track pitch is determined by distance between adjacent parts of the guide track 5. A recording layer 6 is provided on the concavo-convex back surface 2a of the substrate 2. A reflective optical disk has further a reflective layer 7 on the recording layer 6. Either the groove 3 or the land 4 is used for recording information.

Japanese Publication for Examined Patent Application No. 27610/1992 (Tokukouhei 4-27610) discloses a technique of recording information into both the groove and the land of a guide track in an attempt to achieve a high density with these types of optical disks. The disclosed technique doubles the recording density, compared with a conventional technique according to which only either the groove or the land is used for recording. However, the disclosed technique has a problem of low signal quality: reproduction of signals from a target track entails interference (crosstalks) from signals in adjacent portions of the track.

Japanese Laid-Open Patent Application No. 81717/1993 (Tokukaihei 5-81717) discloses a technique of solving the crosstalks. More specifically, a readout layer which changes from in-plane magnetization to perpendicular magnetization with a rise of temperature is provided on a vertically magnetized recording layer of a magneto-optical disk. The layer structure, allowing reproduction of only the information recorded in the high-temperature area created in the center of a reproduction spot, eliminates the crosstalks from signals in the adjacent portions of the track and, at the same time, achieves the high density.

Push-pull technique is used to track both a groove and a land of almost the same width. Referring to FIG. 15, which illustrates push-pull technique, 'b' shows an optical disk having a guide track which is equally divided into a groove 3 and a land 4; 'a' shows a waveform of a tracking error signal obtained when the light spot moves relatively to the guide track. As illustrated here, the tracking error signal corresponding to the position of the light spot on the optical disk has the same cycle as the track pitch. Therefore, the polarity of the tracking error signal (i.e., rising or falling) is used to determine whether the light spot is tracing the groove 3 (represented by the rising polarity in the waveform 'a') or the land 4 (represented by the falling polarity in the waveform 'a'). Push-pull technique thus provides stable tracking servo control.

As described in Japanese Laid-Open Patent Application No. 314538/1993 (Tokukaihei 5-314538), it is known that, in an optical disk of which both the groove and the land are used, one of the side-walls of the groove may be provided to wobble for sensing the address signal of the track scanned by the reproduction spot.

FIGS. 2(a) and 2(b) illustrates respectively optical disks 1 and 1' which have been disclosed in Japanese Laid-Open Patent Application No. 314538/1993. Refer to FIG. 2(a) first. Since the optical disk 1 has basically the same structure as the optical disk 101 shown in FIG. 14, the common components are indicated by the same reference numerals and description thereof is omitted. The optical disk 1 is different from the optical disk 101 in that only one side-wall 3a of the groove 3 of the optical disk 1 wobbles in accordance with address information, while the other side-wall 3b does not wobble. The groove 3 and the land 4 are provided to have the same average width. Both the groove 3 and the land 4 of the optical disk 1 are used to record and reproduce information. By contrast, the optical disk 1', shown in FIG. 2(b), has a wobbling side-wall 3b and an ordinary side-wall 3a.

Referring to FIGS. 16(a) through 16(c), and 17(a) through 17(c), the following description will briefly discuss two techniques (T1) and (T2) of generating tracking error signals and address signals from the optical disk 1 shown in FIG. 2(a).

(T1): Refer to FIGS. 16(a) through 16(c) for the following description about the technique (T1).

FIG. 16(a) shows an arrangement of an optical pickup for sensing signals. Light beams radiated by a semiconductor laser 71 are rendered parallel by a collimating lens 72. The collimated light beams pass through a beam splitter 73 and then are converged by an objective lens 74 to project a tiny light spot on the optical disk 1. The light beams are then reflected by the optical disk 1 and travel along the same optical paths back to the semiconductor laser 71. However, a part of the reflected light beams is reflected at the beam splitter 73 and converged by a converging lens 76 onto an optical sensor 77. The light beams converged onto the optical sensor 77 project a diffraction pattern 80 due to interference between the positive and negative first-order diffracted light beams and the zero-order diffracted light beams generated by a guide track on the optical disk 1 functioning as a diffraction grating.

As shown in FIG. 16(b), the optical sensor 77 is divided into two light receiving sections 77a and 77b. The optical sensor 77 is provided so that the sum total of light received by the light receiving sections 77a and 77b is its maximum when the objective lens 74 is not displaced from the optical axis of the light beams irradiated by the semiconductor laser 71 (i.e., the objective lens 74 is in the neutral position thereof).

The light receiving sections 77a and 77b sense light quantity changes in areas 80a and 80b in the diffraction pattern 80. Then, a tracking error signal S82 and an address signal S83 are calculated from the results of the sensing. More specifically, a differential amplifier 81 receives the light quantity changes from the light receiving sections 77a and 77b, and outputs a difference signal S81. A low-pass filter (LPF) 82, receiving the difference signal S81, eliminates frequency components of the wobbling and then outputs the tracking error signal S82. A high-pass filter (HPF) 83, receiving the difference signal S81, outputs the address signal S83 by sensing frequency components of the wobbling.

(T2): Refer to FIGS. 17(a) through 17(c) for the following description about the second technique (T2).

FIG. 17(a) shows an arrangement of an optical pickup for sensing signals. As described above, the light beams reflected by the optical disk 1 travel along the same optical paths back to the semiconductor laser 71. However, a part of the reflected light beams is reflected at the beam splitter 73 and converged by the converging lens 76 onto the optical sensor 77. As shown in FIG. 17(b), the optical sensor 77 is divided into the two light receiving sections 77a and 77b. The light beams converged onto the optical sensor 77 project the diffraction pattern 80 due to interference between the positive and negative first-order diffracted light beams and the zero-order diffracted light beams generated by a guide track functioning as a diffraction grating. An address signal S85 is calculated from the light quantity changes in the entire diffraction pattern 80. More specifically, an adder amplifier 84 receives the light quantity changes from the light receiving sections 77a and 77b, and outputs a sum signal S84. A high-pass filter (HPF) 85 receives the sum signal S84, and outputs the address signal S85 by sensing frequency components of the wobbling. Meanwhile, the differential amplifier 81 receives the light quantity changes from the light receiving sections 77a and 77b and outputs a difference signal S81. The low-pass filter (LPF) 82 receives the difference signal S81, and outputs a tracking error signal S82 by eliminating frequency components of the wobbling.

Next, referring to FIGS. 18(a) through 18(e), and 19(a) through 19(e), the following description will discuss in detail how the address signal is sensed according to the two techniques (T1) and (T2).

Firstly, refer to FIGS. 18(a) through 18(e) for the following description about an address signal sensing operation when the groove 3 is being tracked. FIG. 18(a) illustrates a tracking operation. The arrow D in FIG. 18(a) indicates the direction of the movement of a light beam B. FIGS. 18(b) through 18(e) show, respectively, outputted waveforms of the light quantity S77a received at the light receiving section 77a, the light quantity S77b received at the light receiving section 77b, the address signal S83 obtained from the difference between the received light quantities S77a and 77b, and the address signal S85 obtained from the sum of the received light quantities S77a and 77b. The horizontal axes of FIGS. 18(b) through 18(e) correspond to the position of the beam B. The alternate long and short dash line in FIG. 18(a) shows a center line 90 of the groove 3 in terms of the actual width thereof. The broken line shows a center line 91 of the groove 3 in terms of the average width thereof.

The actual groove center 90 wobbles along the side-wall 3a of the groove 3. The frequency of the wobbling of the side-wall 3a is set, for example, to about 50 kHz, higher than the follow-up frequency of the tracking control (e.g., about 5 kHz). Therefore, the beam B does not move along the actual groove center 90, but moves along the average groove center 91. Consequently, here occurs a tracking error. Then, the received light quantities S77a and S77b change in accordance with the tracking error as shown in FIGS. 18(b) and 18(c) respectively. The address signals S83 and S85 are obtained, respectively, from the difference signal and the sum signal by using these light quantity changes as shown in FIGS. 18(d) and 18(e).

Secondly, refer to FIGS. 19(a) through 19(e) for the following description about an address signal sensing operation when the land 4 is being tracked. The arrow D in FIG. 19(a) indicates the direction of the movement of a light beam B. FIGS. 19(b) through 19(e) show, respectively, outputted waveforms of the light quantity S77a received at the light receiving section 77a, the light quantity S77b received at the light receiving section 77b, the address signal S83 obtained from the difference between the received light quantities S77a and S77b, and the address signal S85 obtained from the sum of the received light quantities S77a and S77b. The horizontal axes of FIGS. 19(b) through 19(e) correspond to the position of the beam B. The alternate long and short dash line in FIG. 19(a) shows a center line 92 of the land 4 in terms of the actual width thereof. The broken line shows a center line 93 of the land 4 in terms of the average width thereof.

The actual land center 92 wobbles along the side-wall 3a of the groove 3. As discussed earlier, the frequency of the wobbling of the side-wall 3a is set to be higher (e.g., about 50 kHz) than the follow-up frequency of the tracking control (e.g., about 5 kHz). Therefore, the beam B does not move along the actual land center 92, but moves along the average land center 93. Consequently, here occurs a tracking error. Then, the received light quantities S77a and S77b change in accordance with the tracking error as shown in FIGS. 19(b) and 19(c) respectively. The address signals S83 and S85 are obtained, respectively, from the difference signal and the sum signal by using these light quantity changes of the received light as shown in FIGS. 19(d) and 19(e).

However, the problem (P1) below occurs with the technique (T1), according to which the address signal is obtained from the difference between the outputs of the light receiving sections 77a and 77b. Meanwhile, the problem (P2) below occurs with the technique (T2), according to which the address signal is obtained from the sum of the outputs of the light receiving sections 77a and 77b.

(P1): If the objective lens 74 moves in a tracking direction according to, for example, tracking control and is displaced from the optical axis (in other words, the objective lens 74 is displaced from the neutral position thereof), the amplitude of the address signal decreases. Such a decrease in amplitude causes an error in reading out address information and makes it impossible to precisely control the position of the light spot. (P2): A scratch or the like on the optical disk changes the reflectance thereon. This leads to an error in reading out address information and makes it impossible to precisely control the position of the light spot.

The problem (P1) will be discussed first.

Assume that while the address signal S83 is being sensed according to the technique (T1), the objective lens 74 moves in a tracking direction according to, for example, tracking control and is displaced from the optical axis. Refer to FIG. 16(c), which illustrates a light spot movement due to the displacement of the objective lens 74. The light receiving section 77a of the optical sensor 77 receives a part of the light in an area 86b of the diffraction pattern 80 as well as the light in an area 86a. The light receiving section 77b receives only a part of the light in the area 86b.

FIGS. 20(a) through 20(e) illustrate affection of the above displacement. When the light spot B is scanning the wobbling groove 3 in the direction indicated by the arrow D, the light quantity S77a received at the light receiving section 77a changes as shown in FIG. 20(b), and the light quantity S77b received at the light receiving section 77b changes as shown in FIG. 20(c). The address signal S83 is calculated from the difference signal of the received light quantities S77a and S77b. The amplitude of an outputted waveform of the address signal S83 shown in FIG. 20(d) is smaller than that of the outputted waveform with no displacement shown in FIG. 18(d).

The address signal with the smaller amplitude is likely to cause an uncorrectable error in reading out address information. Therefore, in order to prevent the track-following objective lens 74 from being displaced from the optical axis, the optical pickup which senses the address signal through the difference signal requires, in the moving mechanism of the optical pickup, a very quick, highly precise linear motor which moves the optical pickup. However, such a motor makes it difficult to cut the costs.

The above description concerns tracking of the groove 3 of the optical disk 1. However, tracking of the land 4 has the same results and problem. That is, the amplitude of the address signal S83, obtained from the difference signal, decreases in accordance with the displacement of the objective lens tracking the land 4.

On the other hand, the problem does not occur with the address signal S85, which is obtained from the sum signal according to the technique (T2). The following description will discuss this.

As shown in FIG. 17(c), even if the diffraction pattern 80 changes to the diffraction pattern 86, the total light quantity received at the light receiving sections 77a and 77b does not change. In other words, there is no difference between the outputted waveforms of FIGS. 18(e) and 20(e). FIG. 18(e) shows the outputted waveform of the address signal S85 with no displacement, whereas FIG. 20(e) shows the outputted waveform of the address signal S85 calculated from the sum signal of the light receiving sections 77a and 77b with the beam B scanning the wobbling groove 3 in FIG. 20(a). Thus, the amplitude of the address signal does not vary according to the technique (T2). Therefore, the technique (T2) realizes stable readout of address information.

Next, the problem (P2) will be discussed.

Assume that while the address signal is being calculated according to the technique (T2), the reflectance of the optical disk 1 have worsened due to a scratch or the like.

FIGS. 21(a) through 21(e) illustrates the problem (P2). The arrow D indicates the direction of the movement of a light beam B scanning the groove 3. Reflectance is lower in an area 94 in FIG. 21(a) because of a scratch. FIG. 21(b) shows the light quantity S77a received at the light receiving section 77a. FIG. 21(c) shows the light quantity S77b received at the light receiving section 77b. FIG. 21 (e) shows the address signal S85 obtained from the sum signal of the light receiving sections 77a and 77b. It is obvious from FIG. 21(e) that the lower reflectance in the area 94 is affecting the address signal S85.

The above description concerns tracking of the groove 3 of the optical disk 1. However, tracking of the land 4 has the same results and problem. That is, the address signal S85, obtained from the sum signal, is greatly affected by the change of the reflectance of the optical disk 1. The inappropriate address signal S85 is likely to cause an uncorrectable error in reading out address information. Therefore, an optical disk with possible great reflectance change could not be used for an optical pickup for sensing an address signal through a sum signal.

On the other hand, when the address signal is obtained according to the technique (T1), this problem does not occur. Refer to FIGS. 21(a) through 21(e) for the following discussion. The address signal S83 is obtained by subtracting the signals shown in FIGS. 21(b) and 21(c), and has the outputted waveform shown in FIG. 21(d). FIG. 21(d) clearly shows that the lower reflectance in the area 94 less affects the address signal S83. Thus, the address signal S83 is little affected by the reflectance change, which realizes stable readout of address information.

To sum up the discussions so far, an optical disk device generating an address signal from a difference signal has the problem (P1), whereas an optical disk device generating an address signal from a sum signal has the problem (P2).

SUMMARY OF THE INVENTION

In view of the problems, an object of the present invention is to provide an optical disk device capable of stably reading out address information and generating an address signal regardless of various conditions and changes, such as displacement of an objective lens from an optical axis, scratches, dust, a change in reflectance of an optical disk due to a change in reflectance of a reflective layer thereof.

In order to accomplish the object, a first optical disk device in accordance with the present invention is characterized in that it has: (1) an optical pickup, the optical pickup having: a radiating member for radiating a light beam as a light spot for recording/reproducing information onto an optical disk where only one of the side-walls of a spiral tracking groove wobbles in accordance with address information; an objective lens for converging the light beam onto the optical disk; and a light sensor, divided into two parts by a dividing line whose direction coincides to a direction of the groove, for receiving light reflected by the optical disk; (2) a first intermediate address generating member for generating a first intermediate address signal from the wobbling of the side-wall of the groove by using a difference signal of outputs of the light sensor divided into the two parts; (3) a second intermediate address generating member for generating a second intermediate address signal from the wobbling of the side-wall of the groove by using a sum signal of outputs of the light sensor divided into the two parts; and (4) an address generating member for generating an address signal representative of the address information by using the first and second intermediate address signals.

With the arrangement, the address signal representative of the address information is generated from the first and second intermediate address signals generated respectively from the difference and sum signals. The address signal is then used for controlling the position of the light spot on the optical disk. Therefore, an intermediate address signal of good characteristics can be selected between the first and second intermediate address signals. Thus the address signal can be stably generated even when the objective lens is displaced from the neutral position thereof or the reflectance of the optical disk changes. Consequently, such a readout enables readout errors to be restrained, compared with a readout where the address information is read out only from either the difference signal or the sum signal. The position of the light spot can be thus controlled precisely. Moreover, even when the objective lens is displaced, occurrence of errors due to the affections by the displacement is restrained. Therefore, it is possible to adopt a cheap and simple moving mechanism for an optical pickup.

A second optical disk device includes the arrangement of the first optical disk device, and is further characterized in that the address generating member has: (1) an error sensing member for sensing readout errors in the first intermediate address signal and readout errors in the second intermediate address signal; and (2) a signal selecting member for selecting one of the first and second intermediate address signals in accordance with results of sensing by the error sensing member.

The arrangement enables the first optical disk to (1) sense readout errors in at least one of the first and second intermediate address signals, (2) select one of the intermediate address signals in accordance with results of the sensing (e.g., select, between the two intermediate address signals, an intermediate address signal whose errors occur less frequently than a predetermined value), and (3) generate the address signal from the selected signal. Therefore, compared with a case where the address signal is generated from only either of the intermediate address signals, occurrence of errors in generating the address signal can be restrained. Consequently, even when the objective lens is displaced from the neutral position thereof, or the reflectance of the optical disk changes, the address signal can be made to be less affected by such a displacement and change.

A third optical disk device includes the arrangement of the first optical disk device, and is further characterized in that the address generating member has: (1) an amplitude sensing member for sensing a signal amplitude of at least one of the first and second intermediate address signals; and (2) a signal selecting member for selecting one of the first and second intermediate address signals in accordance with results of sensing by the amplitude sensing member.

The arrangement enables the first optical disk to (1) sense a signal amplitude/signal amplitudes of at least one of the first and second intermediate address signals, (2) select one of the intermediate address signals in accordance with results of the sensing (e.g., select, between the two intermediate address signals, an intermediate address signal whose signal amplitude is greater than a predetermined value), and (3) generate the address signal from the selected signal. Consequently, compared with a case where the address signal is generated only from either of the intermediate address signals, errors in generating the address signal and in reading out the address information due to a reduced amplitude can be restrained.

A fourth optical disk device includes the arrangement of the first optical disk device, and is further characterized in that the address generating member has: (1) an error correcting member for correcting errors in the first intermediate address signal and for correcting errors in the second intermediate address signal; and (2) a signal selecting member for selecting, between the first and second intermediate address signals, an intermediate address signal whose errors can be corrected by the error correcting member.

The arrangement enables the first optical disk device to (1) correct errors in both the first and second intermediate address signals, and (2) generate the address signal. Therefore, more errors can be corrected than in a case where one of the intermediate address signals is used for the error sensing. The address signal can be thus generated stably.

A fifth optical disk device includes the arrangement of the first optical disk device, and is further characterized in that it has: an objective lens position sensing member for sensing an amount of displacement of the objective lens from an optical axis of the light beam in a tracking direction, wherein the address generating member generates an address signal representative of the address information from the first intermediate address signal when the amount of the displacement of the objective lens is smaller than a predetermined value, and generates an address signal representatives of the address information from the second intermediate address signal when the amount of the displacement of the objective lens is greater than the predetermined value.

With the arrangement, the optical disk device has the member for sensing the position of the optical lens, and the address signal is generated in accordance with results of the sensing. In other words, the address signal is generated from the first intermediate address signal generated from the difference signal when the amount of the displacement of the objective lens from the position where the objective lens is not displaced from the optical axis of the light beam (hereafter, will be referred to as the neutral position) is smaller than the predetermined value, and generated from the second intermediate address signal generated from the sum signal when the amount of the displacement is greater than the predetermined value.

Therefore, when the objective lens is greatly displaced from the neutral position thereof, the second intermediate address signal which is less affected by the displacement than the first intermediate address signal can be selected. Thus, errors in reading out the address information due to a reduced amplitude of the difference signal can be avoided. When the objective lens is displaced by a small amount, since the first intermediate address signal is used, it is possible to reduce affection by a change of reflectance of the optical disk and to restrain the errors in reading out the address information. Consequently, the position of the optical spot can be precisely controlled. Moreover, since the affection by the displacement of the objective lens is restrained, it is possible to adopt a cheap and simple moving mechanism for an optical pickup.

A sixth optical disk device includes the arrangement of the first optical disk device, and is further characterized in that it has: an inverting member for inverting at least one of the first and second intermediate address signals.

The arrangement enables the first optical disk device to invert at least one of the first and second intermediate address signals. Therefore, it is possible to make the first and second intermediate address signals have the same phase, and to smoothly switch between the first and second intermediate address signals anytime.

A seventh optical disk device is characterized in that it has: (1) an optical pickup; the optical pickup having: a radiating member for radiating a light beam as a light spot for recording/reproducing information onto an optical disk where at least one of the side-walls of a spiral tracking groove wobble(s) in accordance with address information; an objective lens for converging the light beam onto the optical disk; and a light sensor, divided into two parts by a dividing line whose direction coincides to a direction of the groove, for receiving light reflected by the optical disk, (2) an objective lens position sensing member for sensing an amount of displacement of the objective lens from an optical axis of the light beam in a tracking direction; (3) an intermediate address generating member for generating an intermediate address signal from the wobbling of the side-wall(s) of the groove by using a difference signal of outputs of the light sensor divided into the two parts; (4) a gain generating member for generating a gain signal in accordances with the amount of the displacement of the objective lens; (5) an amplifying member for generating an amplified signal of a substantially constant amplitude by amplifying the intermediate address signal in accordance with the gain signal; and (6) an address generating member for generating an address signal representative of the address information from the amplified signal.

With the arrangement, the displacement of the objective lens from the neutral position thereof is sensed, and the gain signal is generated in accordance with the amount of the displacement. The intermediate address signal generated from the difference signal is amplified by the gain signal to generate the amplified signal. Therefore, even when the objective lens is greatly displaced from the optical axis, the amplitude of the amplified signal remains substantially constant. The address signal is generated from the amplified signal. Consequently, it is possible to generate a stable address signal and thus to restrain errors in the address signal. The position of the light spot can be thus controlled precisely. Moreover, since affection by the displacement of the objective lens is restricted, it is possible to adopt a cheap and simple moving mechanism for an optical pickup.

BRIEF DESCRIPTION OF THE DRAWINGS

FIG. 1 is a block diagram showing an arrangement of an optical disk device of a first embodiment in accordance with the present invention.

FIGS. 4(a) through 4(c) are block diagrams showing an arrangement of an address generating circuit.

FIGS. 6(a) through 6(c) are drawings showing an arrangement of the optical sensor.

FIG. 7 is a block diagram showing an arrangement of an address generating circuit.

FIGS. 13(a) through 13(d) are explanatory drawings showing how an address signal is obtained when there is a change in reflectance of an optical disk.

DESCRIPTION OF THE EMBODIMENTS

[First Embodiment]

The following description will discuss a first embodiment in accordance with the present invention. (1) An arrangement and operations of an optical disk device of the present embodiment will be discussed first. (2) Generation of an address signal, a feature of the present invention, will be then discussed in detail.

(1) An arrangement and operations of an optical disk device of the present embodiment.

Figure 2A:
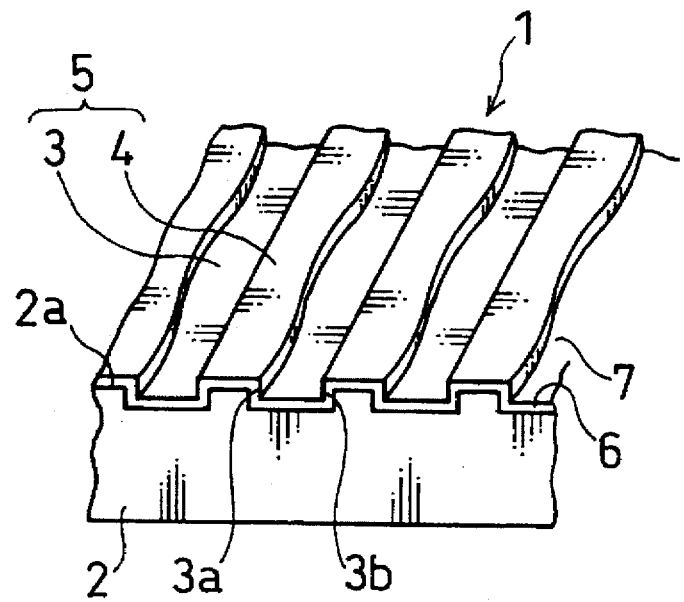
FIGS. 2(a) and 2(b) are enlarged views showing a main part of the optical disk device.

FIG. 1 is a block diagram showing an arrangement of an optical disk device of the first embodiment in accordance with the present invention. An optical disk 1 has a groove 3. As shown in FIG. 2(a), one of the side-walls of the groove 3 is wobbling (the side-wall 3a), and the other side-wall is not wobbling. The frequency of the wobbling is set, for example, to about 50 kHz. Since signal recording frequencies are usually set in the range of 1 MHz to 5 MHz, a high-pass filter (HPF) can separate the wobbling signal and the recording reproduction signals. The optical disk 1 has been discussed in detail in relation with the conventional examples, and further description thereof is omitted.

The following description will discuss how the optical disk device records a signal. A semiconductor laser 11 of a pickup 10 radiates high-powered laser beams to project a tiny light spot onto a recording layer 6 on the optical disk 1. As the temperature of the light spot rises above a predetermined temperature, the light spot forms on the recoding layer 6 an area in which magnetic coercive force is lost. An external magnetic field is then applied to the high-temperature area by a magnetic head (not shown) disposed opposite an objective lens 14 with respect to the optical disk 1. When the high-temperature area cools down to room temperature, the magnetization of the area is fixed in the direction of the applied magnetic field. The signal is thus recorded. Two techniques are available for this kind of recording techniques: i.e., magnetic field modulation recording and light modulation recording. According to magnetic field modulation recording technique, the magnetic field generated by the magnetic head is modulated under constant high-powered beams radiated by the semiconductor laser 11. According to light modulation recording technique, an external magnetic field of the opposite direction from the magnetization direction of an optical disk which, in advance, has been magnetized in one direction as initialization is applied to the optical disk, and the light power of the light beams radiated by the semiconductor laser 11 is modulated.

The following description discusses how the optical disk device reproduces a signal. The semiconductor laser 11 radiates at a readout layer laser beams weaker than that used for recording. The direction of the magnetization of the recording layer is transferred to only a readout layer with a higher temperature than a predetermined temperature. Then the direction of magnetization of that readout layer is sensed according to magneto-optical effect.

The following description will discuss operations of the optical disk device.

Light beams are radiated by the semiconductor laser 11 of the optical pickup 10 for recording and reproducing information. The light beams are rendered parallel by a collimating lens 12. The collimated light beams pass through a beam splitter 13, and then are converged by an objective lens 14 to project a light spot on the optical disk 1. The light beams are then reflected by the optical disk 1 and travel along the same optical paths back to the semiconductor laser 11.

However, a part of the reflected light beams is reflected at the beam splitter 13 and converged by a converging lens 15 onto an optical sensor 16.

Figure 3A:
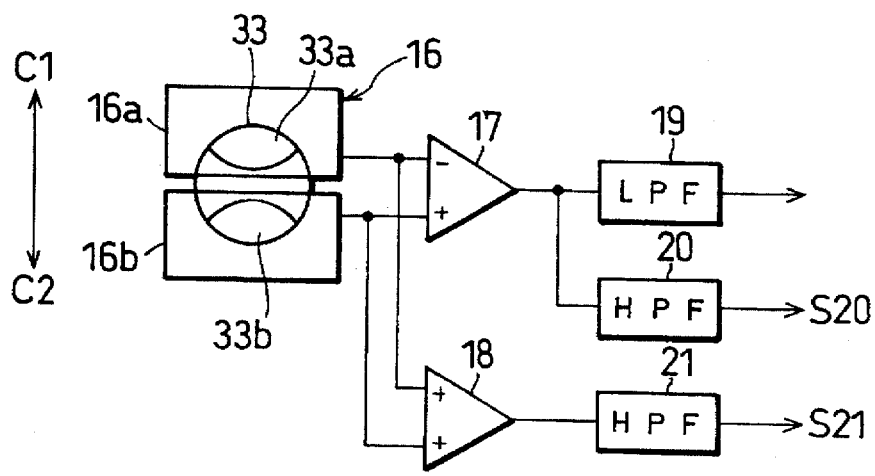
FIGS. 3(a) and 3(b) are block diagrams showing an arrangement of a signal generating section including an optical sensor.
Figure 3B:
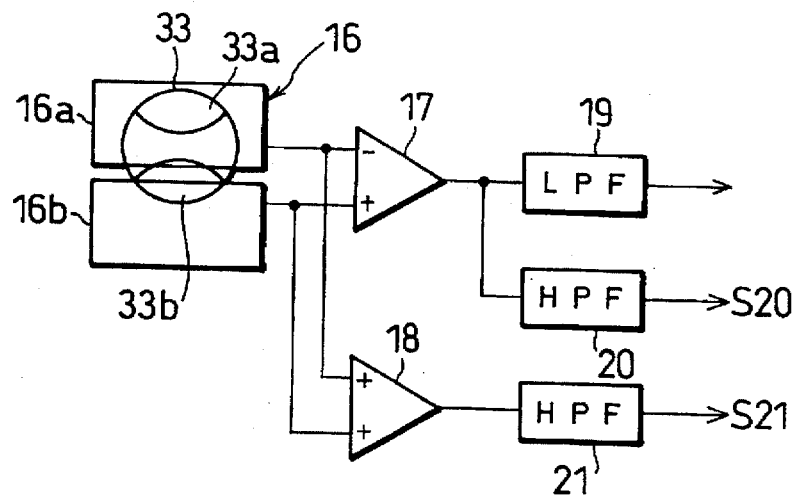

FIGS. 3(a) and 3(b) show a circuit for generating a signal through the optical sensor 16. The optical sensor 16 is divided into two light receiving sections 16a and 16b by a dividing line corresponding to a direction of the groove 3. The light beams reflected by the optical disk 1 project a diffraction pattern 33 on the light receiving sections 16a and 16b. The optical sensor 16 is provided so that the sum total of light received by the light receiving sections 16a and 16b is its maximum when the objective lens 14 is not displaced from the optical axis of the light beams irradiated by the semiconductor laser 11.

A differential amplifier 17 and the adder amplifier 18, connected to the optical sensor 16, generate a tracking error signal and an address signal in accordance with a light intensity change in areas 33a and 33b in the diffraction pattern 33. The tracking error signal is used by a tracking actuator 41 for controlling motion of the objective lens 14 in the tracking direction. The address signal, a signal representative of address information recorded in the groove 3, is used to control the position of the light spot on the optical disk 1.

The tracking error signal is generated by generating, by a differential amplifier 17, a difference signal of the signals out of the light receiving sections 16a and 16b, and then extracting, by a low-pass filter (LPF) 19, low frequency components from the difference signal.

The following description will discuss how the tracking error signal controls the tracking actuator 41. When the light spot on the optical disk 1 is guided to the groove 3 (to the rising polarity portion of the waveform 'a' in FIG. 15), the tracking error signal (the output of the LPF 19) is directly fed to a tracking control circuit 28 in accordance with a control signal S32a out of a system controller 32. The tracking control circuit 28 then applies a drive current to the tracking actuator 41 which, in turn, controls the positions of the objective lens 14 and a lens movable section 40 in an orthogonal direction to the track. Meanwhile, when the light spot is guided to the land 4 of the optical disk 1 (to the falling polarity portion of the waveform 'a' in FIG. 15), the tracking error signal is fed to the tracking control circuit 28 after being inverted by a polarity inverting circuit (inverting means) 23 in accordance with the control signal S32a. The tracking control circuit 28 then applies a drive current to the tracking actuator 41 which, in turn, controls the positions of the objective lens 14 and the lens movable section 40 in an orthogonal direction to the track. The light spot thus follows the track.

The address signal is generated by a first intermediate address generating means (the differential amplifier 17 and an HPF 20), a second intermediate address generating means (the adder amplifier 18 and an HPF 21), and an address generating means (an address generating circuit 26). Firstly, the differential amplifier 17 sends a difference signal to the high-pass filter (HPF) 20, which generates a first intermediate address signal S20. The adder amplifier 18 sends a sum signal to the high-pass filter (HPF) 21, which generates a second intermediate address signal S21. Then, the address generating circuit 26, receiving the first and second intermediate address signals S20 and S21, generates an address signal S26. Details of generating this signal will be discussed later.

The address signal S26 is an address (a physical address) recorded by the wobbling of the side-wall 3a of the groove 3. The physical address combined with the tracking polarity and then converted is called a logical address. An address calculating circuit 27 carries out the conversion by changing the address signal S26 in accordance with the control signal S32a representative of tracking polarity outputted by the system controller 32. In other words, the address calculating circuit 27 judges through the control signal S32a whether the light spot is tracking the groove 3 or the land 4 of the optical disk, and outputs a logical address signal S27 which varies in accordance with the judgement.

The following description will discuss how the position of the light spot on the optical disk 1 is controlled in accordance with the logical address signal S27. Control means is composed of a tracking control circuit 28, a slide motor drive circuit 29, a slide motor 30 and the system controller 32.

When the optical pickup 10 performs an access operation, the slide motor drive circuit 29 receives a control signal S32c from the system controller 32, and drives the slide motor 30, which, in turn, moves the optical pickup 10 to a target track. Under normal reproduction, the tracking control circuit 28, receiving a control signal S32b, drives the slide motor 30 in accordance with low frequency components of the tracking error signal fed to the tracking control circuit 28. The slide motor 30, in turn, gradually moves the optical pickup 10 in a radial direction, as the reproduction proceeds.

The block diagram of FIG. 1 showing an optical disk device does not include, for example, a focus error sensing system for controlling focus servo in the optical pickup 10 and a system recording/reproducing information on the optical disk 1. However, needless to say, these systems are actually incorporated in the optical disk device. Astigmatic technique or knife edge technique is used to sense a focusing error signal in the focus error sensing system. These techniques are well-known; therefore description thereof is omitted.

The address signal S26 is also used to control rotation of the optical disk 1. In other words, the optical disk 1 can be controlled to rotate at a constant linear velocity if the spindle motor (not shown) is controlled so that the frequency of the wobbling included in the address signal S26 equals a standard frequency.

(2) Details of generating the address signal (a feature of the present invention).

The address generating circuit 26 reads out address information from the first and second intermediate address signals S20 and S21, and generates the address signal S26. Although the address signal S26 may be generated in various ways, three techniques (i), (ii) and (iii) will be discussed in the following.

(i): A technique for monitoring errors in the first or second intermediate address signal S20 or S21, and then generating the address signal S26 in accordance with an intermediate address signal having a lower error occurrence rate than a predetermined level.

Refer to FIG. 4(a), a block diagram showing an arrangement of the address generating circuit 26 used for the technique (i). A demodulating circuit 262, a circuit for demodulating a signal, is error sensing and correcting means. An address selecting circuit 261, a circuit for selecting a signal, is signal selecting means.

Usually, the address information is modulated, for example, according to FM modulation when recorded in the optical disk 1, and demodulated before being read out. Upon the demodulation, errors included in a read-out signal are sensed and corrected. However, if amplitude of the signal is reduced, or there is a change in reflectance of the optical disk 1, the number of errors is so great that the errors are difficult to correct.

With the arrangement shown in FIG. 4(a), the address selecting circuit 261 selects either the first intermediate address signal S20 or the second intermediate address signal S21, and outputs the selected signal as a selected signal S261 to a demodulating circuit 262. If more errors are sensed in the selected signal S261 by the demodulating circuit 262 than a predetermined value, a switching signal S262 is sent from the demodulating circuit 262 to the address selecting circuit 261. The address selecting circuit 261 switches the selected signal S261 in accordance with the switching signal S262. The address signal S26 is thus generated in accordance with the selected signal S261. Therefore, errors are less likely to occur, compared with a case where only one intermediate address signal is used.

In the above example, the demodulating circuit 262 senses errors in only either the first or second intermediate address signal S20 or S21. However, it is needless to say that the demodulating circuit 262 may be arranged to sense errors in both of the first and second intermediate address signals S20 and S21, and then select an intermediate address signal in accordance with the results of the sensing.

(ii): A technique for monitoring amplitude of the first or second intermediate address signal S20 or S21, and then generating the address signal S26 in accordance with an intermediate address signal having a greater signal amplitude than a predetermined level.

Refer to FIG. 4(b), a block diagram showing an arrangement of the address generating circuit 26 used for the technique (ii). This arrangement includes, in addition to the arrangement in FIG. 4(a), an amplitude sensing circuit 263 (amplitude sensing means) provided between the address selecting circuit 261 and the demodulating circuit 262.

According to the technique (ii), the address selecting circuit 261 selects either the first intermediate address signal S20 or the second intermediate address signal S21, and outputs the selected signal as a selected signal S261. The amplitude sensing circuit 263 monitors amplitude of the selected signal S261. If amplitude below a predetermined level is monitored, the amplitude sensing circuit 263 outputs a switching signal S263. The address selecting circuit 261 switches the selected signal S261 in accordance with the switching signal S263. The address signal S26 is thus generated in accordance with the selected signal S261. Therefore, even when amplitude of a signal is reduced due to, for example, a displacement of the objective lens from the optical axis, errors are restrained in reading the address information, and the position of the light spot can be precisely controlled. Moreover, since affection by the displacement of the objective lens 14 is restrained, it is possible to adopt a cheap and simple moving mechanism for the optical pickup 10.

The predetermined level of the signal amplitude is determined in accordance with, for example, the recording frequency, the reflectance of the disk and circuit factors. For example, set the predetermined level of the signal amplitude to half the signal amplitude obtained when the objective lens is in the neutral position thereof.

In the above example, the amplitude sensing circuit 263 senses the signal amplitude of only either the first or second intermediate address signal S20 or S21. However, it is needless to say that the amplitude sensing circuit 263 may be arranged to sense the signal amplitudes of both the first and second intermediate address signals S20 and S21, and then select an intermediate address signal in accordance with the results of the sensing.

(iii): A technique for correcting readout errors in the address information in accordance with the first and second intermediate address signals S20 and S21, and using the corrected signal as the address signal S26.

Refer to FIG. 4(c), a block diagram showing an arrangement of the address generating circuit 26 used for the technique (iii).

According to the technique (iii), the address selecting circuit 261 selects either the first intermediate address signal S20 or the second intermediate address signal S21, and outputs the selected signal as a selected signal S261 to a demodulating circuit 262. Although the demodulating circuit 262 corrects errors in the selected signal S261, if there are too many errors in the selected signal S261, the errors can not be corrected (bytes including errors is still identified). When there are too many errors, the demodulating circuit 262 outputs an uncorrectable error signal S262' to the address selecting circuit 261. The address selecting circuit 261 switches from the selected signal S261 which includes bytes with uncorrectable errors to the other intermediate address signal in accordance with the uncorrectable error signal S262'. The address signal S261 is generated according to the newly selected intermediate address signal. Therefore, as long as the first and second intermediate address signals S20 and S21 do not have an error in the same byte, the error is corrected.

Next, the following description will discuss a technique for smoothly switching between the first and second intermediate address signals S20 and S21.

If the first and second intermediate address signals S20 and S21 have the same phase, the switching will be smoothly carried out. Phase relation between the first intermediate address signal generated from the difference signal and the second intermediate address signal generated from the sum signal is the same regardless of whether the groove 3 or the land 4 is being scanned as shown in FIGS. 18(d), 18(e), 19(d) and 19(e) (reasons will be discussed later). Therefore, if means is provided for inverting the phase of one of the intermediate address signals, the phases coincide with each other by (1) reproducing the two intermediate address signals S20 and S21 for comparison of the phases before the signals recorded on the optical disk is reproduced and (2) if necessary (i.e., if the phases are 180 degrees different from each other), inverting either the intermediate address signal S20 or S21. The phase of the difference signal inverts, as discussed later, in accordance with the polarity inversion of the tracking error signal. Accordingly, the polarity of the tracking error signal is determined by the polarity inverting circuit 23 with respect to the groove 3 and the land 4 so that the phases of the intermediate address signals coincide with each other (see FIG. 15). Consequently, the phases of the first intermediate address signal generated from the difference signal and of the second intermediate address signal generated from the sum signal coincide with each other in the present embodiment.

Figure 2B:
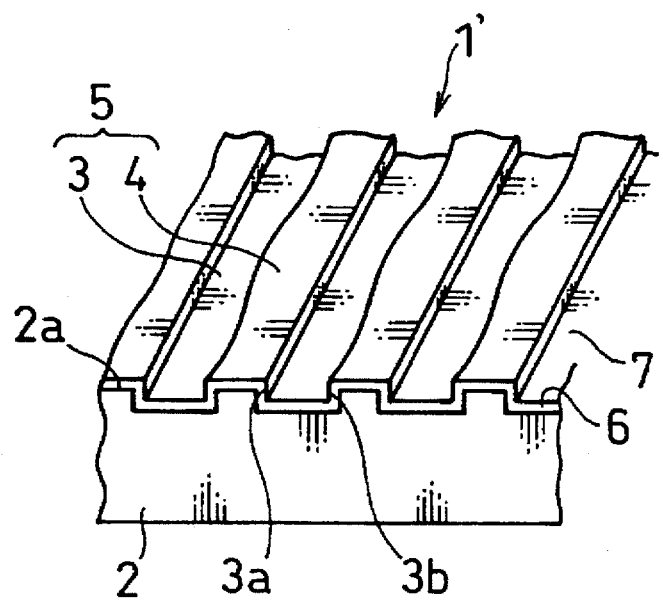

The optical disk 1 has the wobbling side-wall 3a of the groove 3 in accordance with the address information as shown in FIG. 2(a). However, another type of optical disk 1' has the wobbling side-wall 3b of the groove 3 in accordance with the address information as shown in FIG. 2(b). The optical disk 1' having the wobbling side-wall 3b of the groove 3 has an inverted phase of the optical disk 1. Therefore, the above technique may also be applied to the optical disk 1' to make the phases of the two intermediate address signals coincide with each other.

Figure 18A:
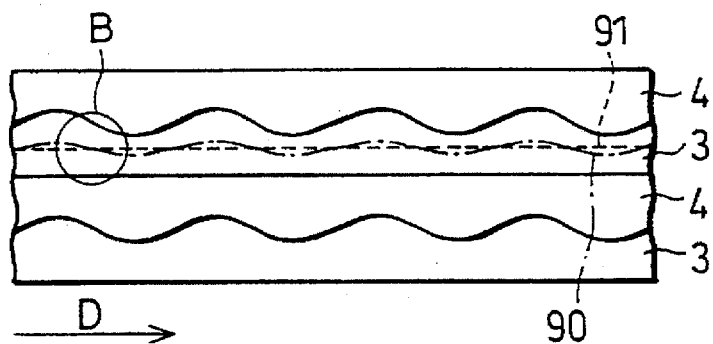
FIGS. 18(a) through 18(e) are explanatory drawings showing how an address signal is conventionally obtained from a groove.
Figure 18B:
Figure 18C:
Figure 19A:
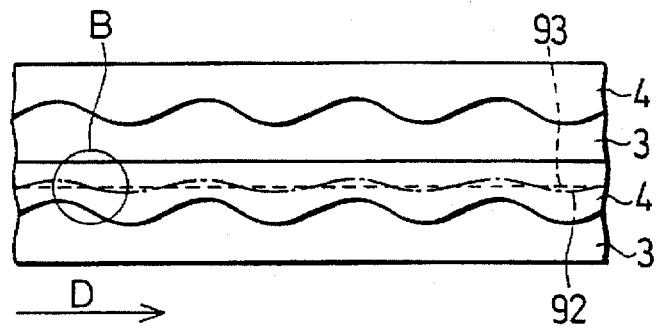
FIGS. 19(a) through 19(e) are explanatory drawings showing how an address signal is conventionally obtained from a land.
Figure 19B:
Figure 19C:

Here is discussed the reasons for consistency in the phase relation of the phases of the first intermediate address signal generated from the difference signal and of the second intermediate address signal generated from the sum signal regardless of whether the groove 3 and the land 4 is being scanned. Refer to FIG. 18(a) for a case where the groove 3 is being scanned and to FIG. 19(a) for a case where the land 4 is being scanned. Suppose that the spot is displaced from the track center in the same direction on the optical disk for both cases (i.e., the spot has moved in the direction D the same length from the position B for both cases).

Figure 18D:
Figure 18E:
Figure 19D:
Figure 19E:
Figure 20A:
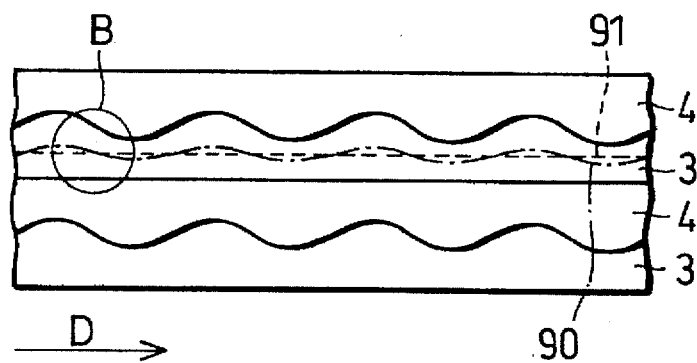
FIGS. 20(a) through 20(e) are explanatory drawings showing how an address signal is obtained when an objective lens is displaced from the optical axis.
Figure 20B:
Figure 20C:
Figure 20D:
Figure 20E:
Figure 21A:
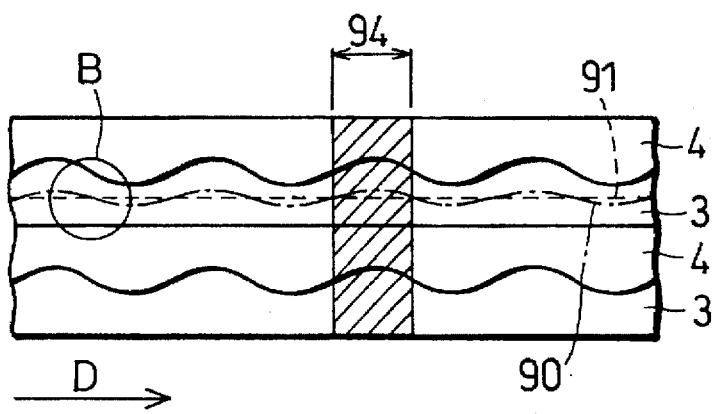
FIGS. 21(a) through 21(e) are explanatory drawings showing how an address signal is obtained when there is a change in reflectance of an optical disk.
Figure 21B:
Figure 21C:
Figure 21D:
Figure 21E:

Regardless of whether the groove 3 or the land 4 is being scanned, the sum signal is strong where the track is wide, and weak where the track is narrow. The narrow track width in FIG. 18(a) corresponds to the wide track width in FIG. 19(a). As a result, the signal detected when the groove 3 is being scanned and the signal detected when the land 4 is being scanned have opposite phases as shown in FIGS. 18(e) and 19(e).

Figure 15:
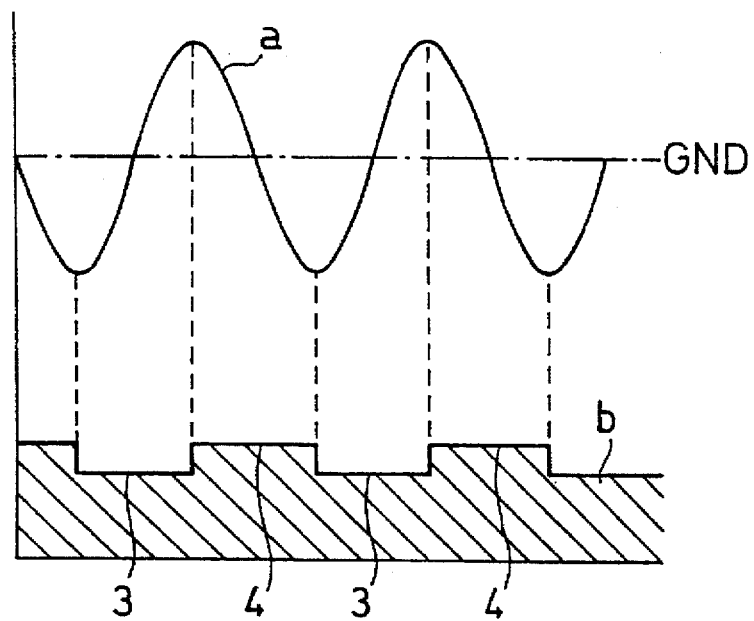
FIG. 15 is a explanatory drawing showing a relation between a track and a tracking error signal waveform obtained according to push-pull technique.
Figure 16A:
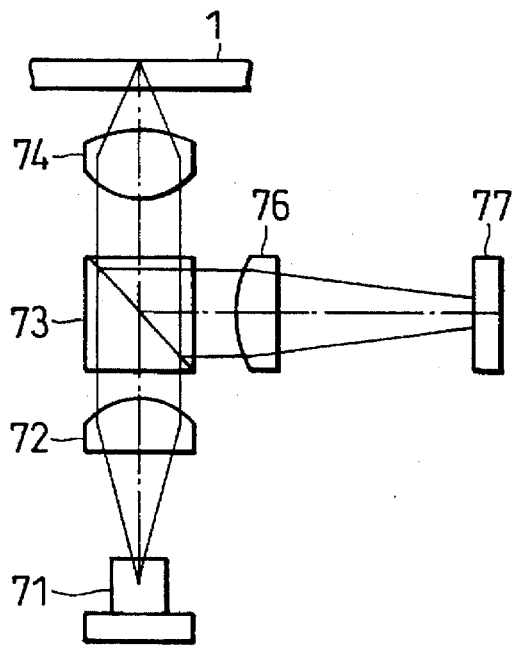
FIGS. 16(a) through 16(c) are drawings showing an arrangement of a main part of a conventional optical pickup.
Figure 16B:
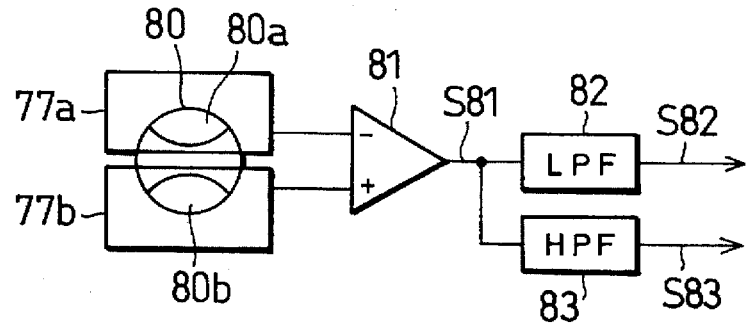
Figure 16C:
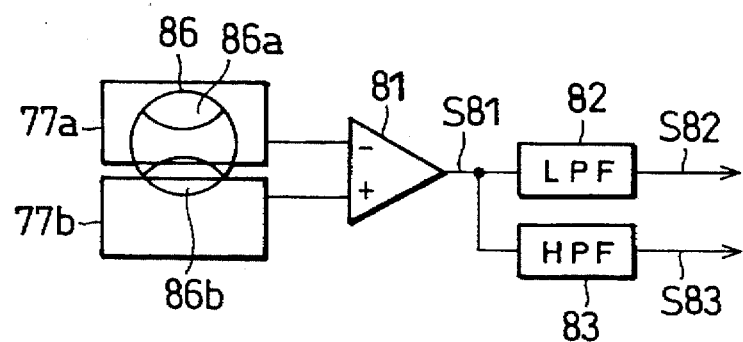
Figure 17A:
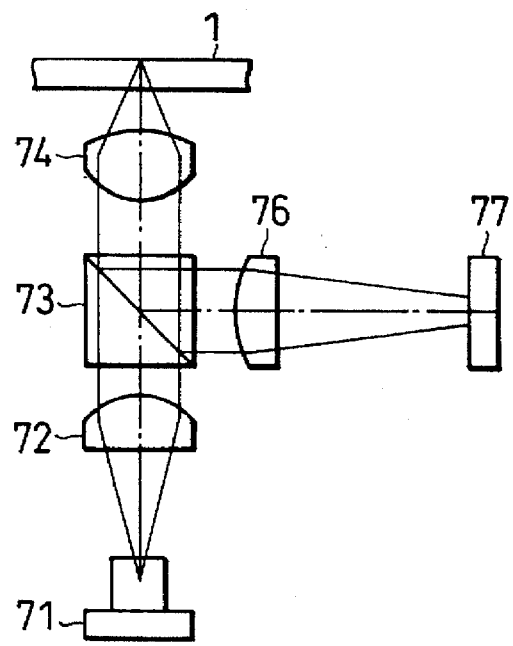
FIGS. 17(a) through 17(c) are drawings showing another arrangement of a main part of a conventional optical pickup.
Figure 17B:
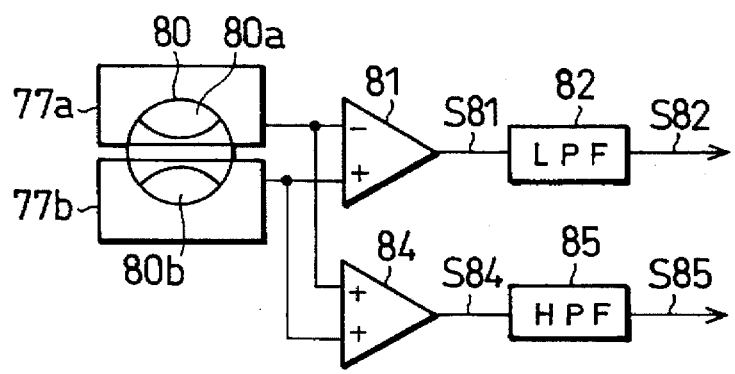
Figure 17C:
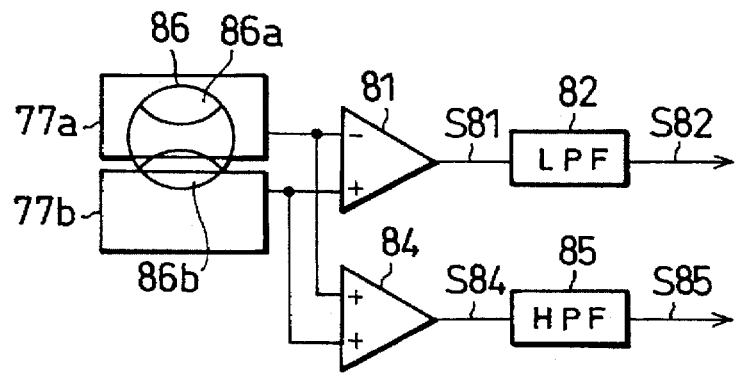

Meanwhile, the difference signal changes in accordance with the tracking error. As described above, the spot is displaced from the track center in the same direction for both cases. But, the tracking error signal has the opposite polarities with respect to the groove 3 and the land 4 as shown in FIG. 15. As a result, the signal detected when the groove 3 is being scanned and the signal detected when the land 4 is being scanned have opposite phases as shown in FIGS. 18(d) and 19(d).

Accordingly, the signal detected when the groove 3 is being scanned and the signal detected when the land 4 is being scanned have opposite polarities with respect to both the sum signal and the difference signal. Therefore, the phase relation between the intermediate address signals generated from the difference signal and from the sum signal does not change regardless of whether the groove 3 or the land 4 is being scanned.

As described above, if the first and second intermediate address signals S20 and S21 are made to have the same phase, the signals are switched anytime without interruption in the outputted waveform.

In the description above, magneto-optical material is used as the recording layer 6 of the optical disk 1. However, a phase change material may be used instead. If a phase change material is used, a signal is recorded by radiating a light beam to heat up a local spot and thus changing an optical constant or physical shape thereof. For example, a phase change material which is crystalline if abruptly heated up and then abruptly cooled down, but is amorphous if abruptly heated up and then gradually cooled down may be used to obtain different reflectances depending on the crystalline state and the amorphous state. A signal is recorded by modulating the light strength of the light beam. Upon reproduction of the signal, a light beam is radiated with a light strength weaker than upon recording, as weak as not to affect the recording layer. The signal is reproduced through a change of the reflectance of the recording layer.

[Second Embodiment]

Figure 5:
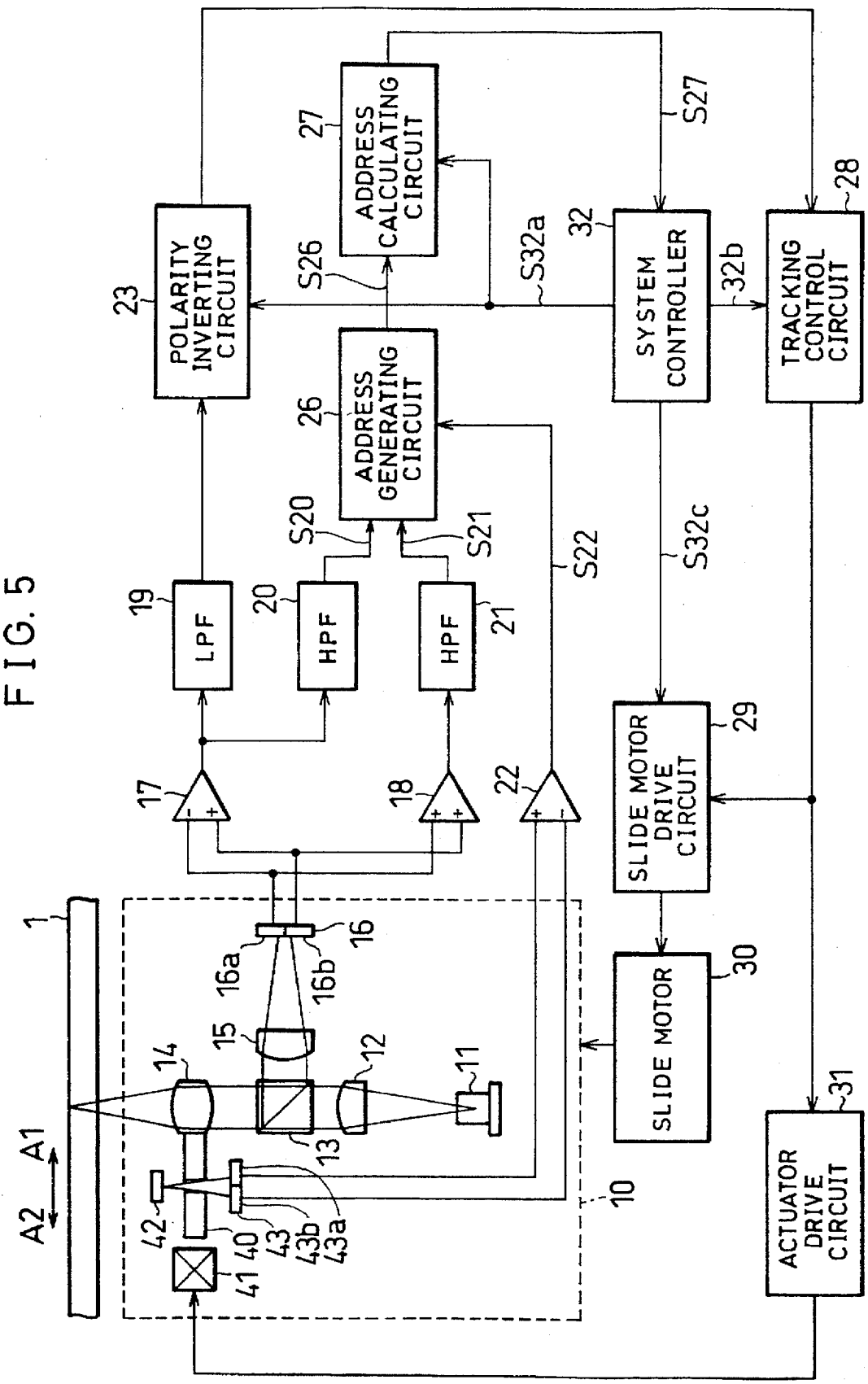
FIG. 5 is a block diagram showing an arrangement of an optical disk device of a second embodiment.

FIG. 5 is a block diagram showing an arrangement of an optical disk device of a second embodiment in accordance with the present invention. Since FIG. 5 shows, basically, the same arrangement with the first embodiment, the common members of FIGS. 1 and 5 are indicated by the same reference numerals and detailed description thereof is omitted.

The optical disk device of the present embodiment senses the position of an objective lens, and generates a address signal S26 which is a physical address in accordance with the results of the sensing. The following description will discuss the arrangement of the optical disk.

A lens movable section 40 has an aperture. Indicated by the numeral 42 is a light emitting element for sensing the position of the objective lens. Indicated by the numeral 43 is a light sensor for sensing the position of the objective lens by receiving the light which has been radiated by the light emitting element 42 and then passed through the aperture of the lens movable section 40. The light sensor 43 has light receiving sections 43a and 43b. Indicated by the numeral 22 is a differential amplifier connected to the light receiving sections 43a and 43b and outputting an objective lens position signal S22. The lens movable section 40, the light emitting element 42, the light sensor 43 and the differential amplifier 22 compose objective lens position sensing means. Indicated by the numeral 26 is an address generating circuit for receiving a first intermediate address signal S20, a second intermediate address signal S21, and the objective lens position signal S22 and generating the address signal S26 through the operations described later.

The following description will discuss the operations of the optical disk device of the present embodiment.

First, the objective lens position sensing means will be discussed. FIGS. 6(a) through 6(c) illustrate an arrangement of the light sensor 43. As shown in FIGS. 6(a) through 6(c), the light sensor 43 is composed of the two light receiving sections 43a and 43b. The light sensor 43 is provided so that if an objective lens 14 is in the neutral position thereof, the center of the light spot 44 coincides with the dividing line between the light receiving sections 43a and 43b as shown in FIG. 6(a). A part of the light radiated by the light emitting element 42, as shown in FIG. 5, passes through the aperture of the lens movable section 40. As the lens movable section 40 moves in a tracking direction (in an orthogonal direction to the track) according to tracking control, the light radiated by the light emitting element 42 and passing through the aperture of the lens movable section 40 also moves. The light spot 44 on the light sensor 43 moves in accordance with that movement of the light. Specifically, when the objective lens 14 moves in the direction denoted as A1 in FIG. 5, the light spot 44 moves in the direction denoted as C1 in FIG. 6(a). The result is shown in FIG. 6(b). On the other hand, when the objective lens 14 moves in the direction denoted as A2 in FIG. 5, the light spot 44 moves in the direction denoted as C2 in FIG. 6(a). The result is shown in FIG. 6(c). The amplifier 22 calculates a difference signal of the light receiving sections 43a and 43b. The objective lens position signal S22 is thus sensed.

Next, the following description will discuss the generation of the address signal S26. The address generating circuit 26 receives the objective lens position signal S22. The address generating circuit 26 is arranged to generate the address signal S26 from the first intermediate address signal S20 when the objective lens 14 is in a neighborhood of the neutral position thereof, and to generate the address signal S26 from the second intermediate address signal S21 when the objective lens 14 shifts greatly from the neutral position thereof. Details will follow.

FIG. 7 is a block diagram showing an arrangement of the address generating circuit 26. As shown in FIG. 7, the address generating circuit 26 is composed of an address selecting circuit 261 and a demodulating circuit 226. The address selecting circuit 261 selects either the first or second intermediate address signal S20 or S21 in accordance with the objective lens position signal S22, and outputs the selected signal as a selected signal S261. The demodulating circuit 262 demodulates the selected signal S261, corrects errors and generates the address signal S26.

Figure 8:
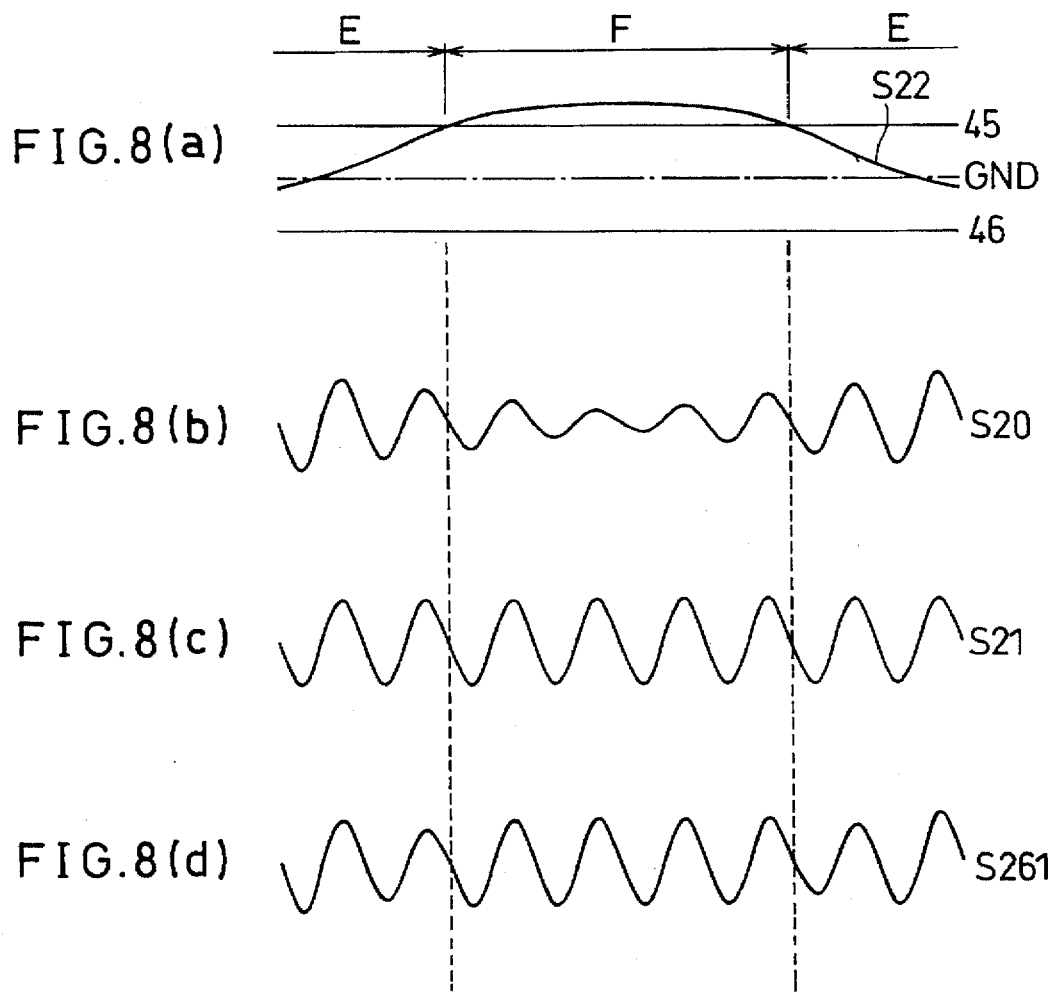
FIGS. 8(a) through 8(d) are explanatory drawings showing how an address signal is obtained.

FIGS. 8(a) through 8(d) illustrate an address signal generating operation. FIG. 8(a) shows the objective lens position signal S22 obtained through the light sensor 43. FIG. 8(b) shows the first intermediate address signal S20. FIG. 8(c) shows the second intermediate address signal S21. An area E in FIG. 8(a) indicates that the objective lens position signal S22 is in the range of predetermined level between 45 and 46 (i.e., the objective lens 14 is in the neutral position thereof). An area F in FIG. 8(a) indicates that the objective position signal S22 is out of the range of the predetermined level between 45 and 46 (i.e., the objective lens 14 greatly shifts from the neutral position thereof). The neutral position of the objective lens 14 is denoted as GND in FIG. 8(a).

As shown in FIG. 8(b), the amplitude of the first intermediate address signal S20 decreases as the objective lens 14 shifts from the neutral position thereof. Such a decrease in amplitude causes an error in reading out address information, and is therefore not desirable. For this reason, in the present embodiment, the address selecting circuit 261 selects the first intermediate address signal S20 in the area E, in which the objective lens position signal S22 is in the range of the predetermined level between 45 and 46, and selects the second intermediate address signal S21 in the area F, in which the objective lens position signal S22 is out of the range of the predetermined level between 45 and 46, as shown in the waveform of the selected signal S261 of FIG. 8(d).

Figure 9:
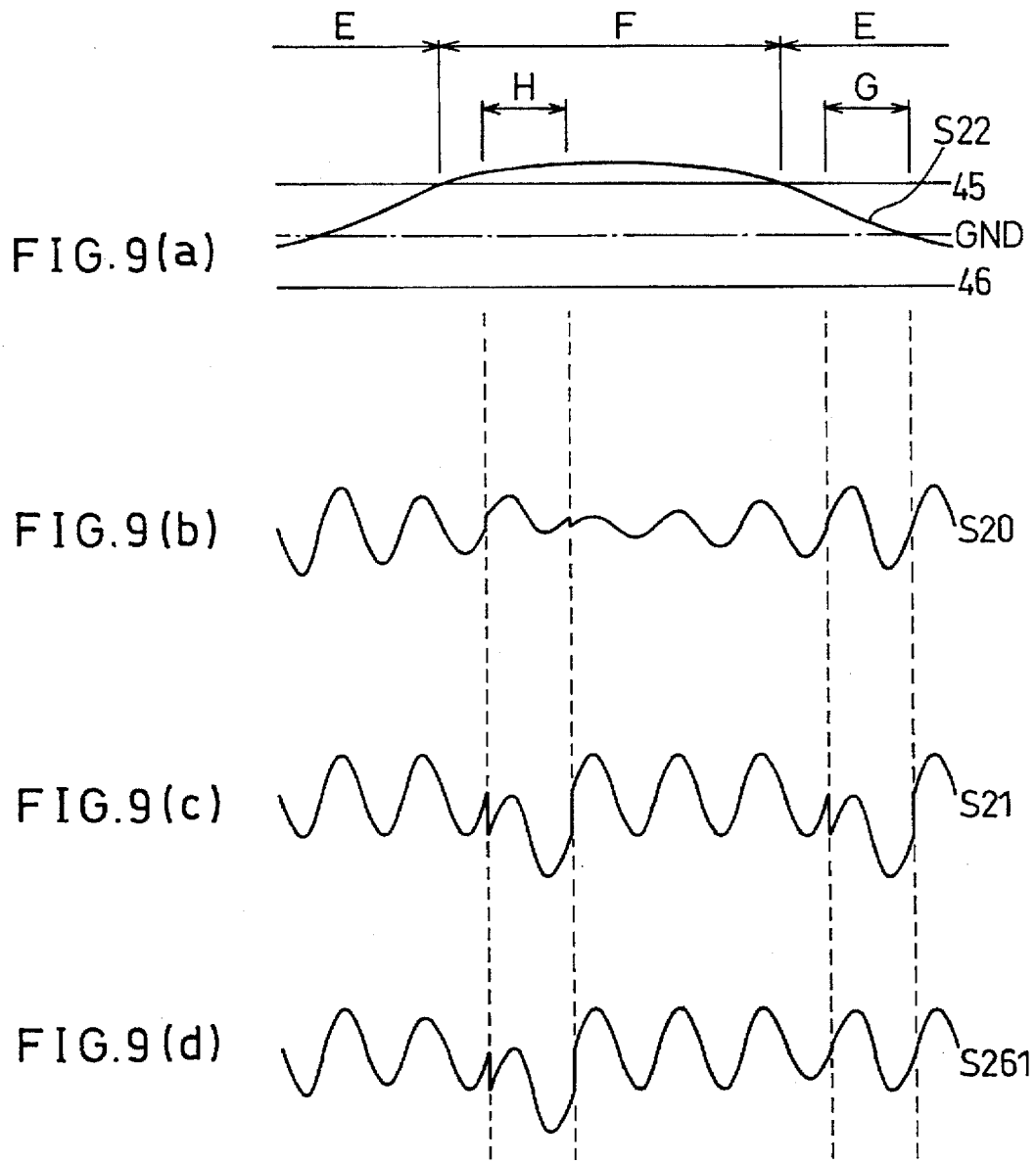
FIGS. 9(a) through 9(d) are explanatory drawings showing how an address signal is obtained when there is a change in reflectance of an optical disk.

FIGS. 9(a) through 9(d) illustrate an address signal generating operation when there is a change in the reflectance of the disk 1. FIG. 9(a) shows an outputted waveform of the objective lens position signal S22 obtained through the light sensor 43. FIG. 9(b) shows an outputted waveform of the first intermediate address signal S20. FIG. 9(c) shows an outputted waveform of the second intermediate address signal S21. FIG. 9(d) shows an output waveform of the selected signal S261. Areas G and H in the respective areas E and F in FIG. 9(a) show that the reflectance therein is lower than in other areas.

The objective lens position signal S22 changes in accordance with the position of the objective lens 14 as shown in FIG. 9(a). In the area E, in which the objective lens position signal S22 is in the range of the predetermined level between 45 and 46, the first intermediate address signal S20 is selected. In the area F, in which the objective lens position signal S22 is out of the range of the predetermined level between 45 and 46, the second intermediate address signal S21 is selected. In the area G in the area E, in which the reflectance of the disk 1 is lower, the first intermediate address signal S20 is selected. Since the first intermediate address signal S20 is a difference signal, there is little affection by the reflectance change in the area G. In the area H in the area F, in which the reflectance of the disk 1 is lower, the second intermediate address signal S21 is selected. Since the second intermediate address signal S21 is a sum signal, there is great affection by the reflectance change in the area H. But, this does not matter much because it is highly unlikely that the objective lens shifts greatly and that the reflectance change, such as in the area H, occurs at the same time.

Note that each range of the predetermined level between 45 and 46 is set, for example, so that the first intermediate address signal S20 with the objective lens 14 in the position indicated by the level has half the signal amplitude of the first intermediate address signal S20 with the objective lens 14 in the neutral position thereof.

As described above, in the present embodiment, the first intermediate address signal S20, obtained from a difference signal, is used when the objective lens 14 is in the neighborhood of the neutral position thereof, and the second intermediate address signal S21, obtained from a sum signal, is used when the objective lens 14 shifts. This prevents readout errors caused by the shift of the objective lens 14, and restrains readout errors caused by the reflectance change of the disk 1.

Means to make phases of the first and second intermediate address signals S20 and S21 coincide with each other has been provided in the first embodiment. If the same means is provided to the address selecting circuit 261 in the second embodiment, the switching between the first and second intermediate address signals S20 and S21 in the second embodiment is smoothly carried out in the same manner as in the first embodiment.

The objective lens position sensing means may have a different arrangement from the arrangement above. For example: The light sensor senses the light radiated by the light emitting element 42 and then reflected by a reflector member provided to the objective lens movable section 40. The amount of light sensed by the light sensor is then calculated by an amplifier. Another example: a part of the light radiated by a semiconductor laser 11 may be used, in lieu of the light emitting element 42 as a separate light source, as a light source for sensing the position of the objective lens. Moreover, the sensing of the position of the objective lens may be carried out mechanically or magnetically instead of optically.

[Third Embodiment]

An optical disk device of the present embodiment reads out address information without using a sum signal, which is greatly affected by a change in reflectance of the optical disk. Specifically, the optical disk device senses the position of an objective lens and generates a gain signal in accordance with the results of the sensing. An intermediate address signal generated from a difference signal is amplified by the gain signal to produce an address signal. The intermediate address signal of the present embodiment is the first intermediate address signal in the first embodiment, and will be referred to as the first intermediate address signal hereafter.

Figure 10:
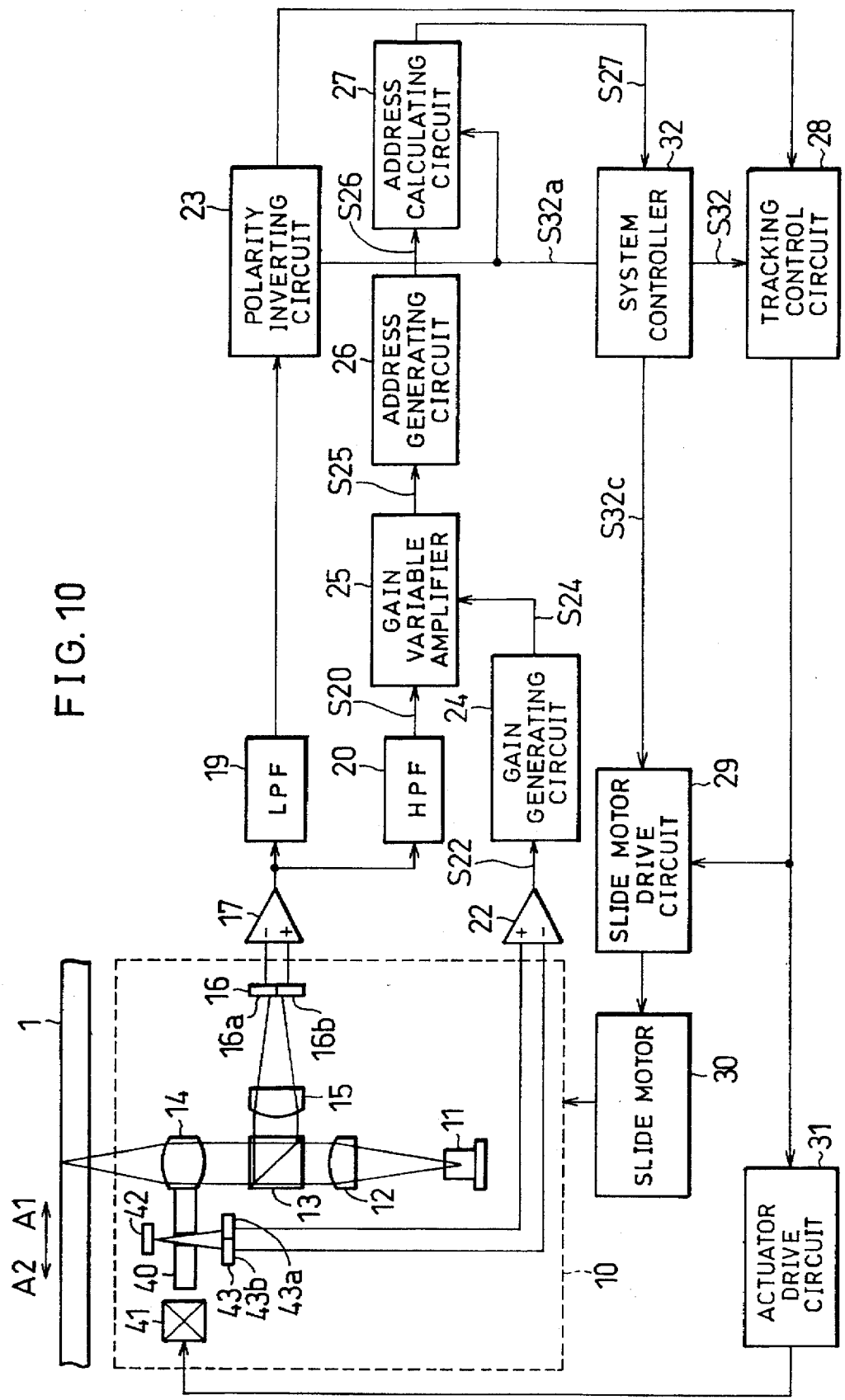
FIG. 10 is a block diagram showing an arrangement of an optical disk device of a third embodiment.

FIG. 10 is a block diagram showing an arrangement of the optical disk device. Since FIG. 10 shows, basically, the same arrangement with the first embodiment, the common members of FIGS. 1, 5, and 10 are indicated by the same reference numerals and detailed description thereof is omitted. Intermediate address generating means of the present embodiment is the first intermediate address generating means of the first embodiment, that is, an amplifier 17 and an HPF 20.

The following description will discuss an arrangement of the optical disk device of the present embodiment. A lens movable section 40 has an aperture. Indicated by the numeral 42 is a light emitting element for sensing the position of the objective lens. Indicated by the numeral 43 is a light sensor for sensing the position of the objective lens by receiving the light which has been radiated by the light emitting element 42 and then passed through the aperture of the lens movable section 40. The light sensor 43 has light receiving section 43a and 43b. Indicated by the numeral 22 is a differential amplifier connected to the light receiving sections 43a and 43b and outputting an objective lens position signal S22. The lens movable section 40, the light emitting element 42, the light sensor 43 and the differential amplifier 22 compose objective lens position sensing means.

Indicated by the numeral 24 is a gain generating circuit (gain generating means) for generating a gain signal S24 of a gain variable amplifier 25 (described later) from the objective lens position signal S22. Indicated by 25 is the gain variable amplifier (amplifying means) for amplifying the first intermediate address signal S20 inputted from the HPF 20 with the gain signal S24 generated by the gain generating circuit 24 and then outputting an amplified signal S25. Indicated by 26 is an address generating circuit (address generating means) for receiving the amplified signal S25 outputted by the gain variable amplifier 25 and for outputting an address signal S26 representative of a physical address. The address generating circuit 26 demodulates and correct errors of the amplified signal S25.

The following description will discuss operations of the optical disk device of the present embodiment.

The optical disk of the present embodiment senses the position of the objective lens 14 in the same manner as that of the second embodiment. Description of the sensing technique is therefore omitted.

Figure 11A:
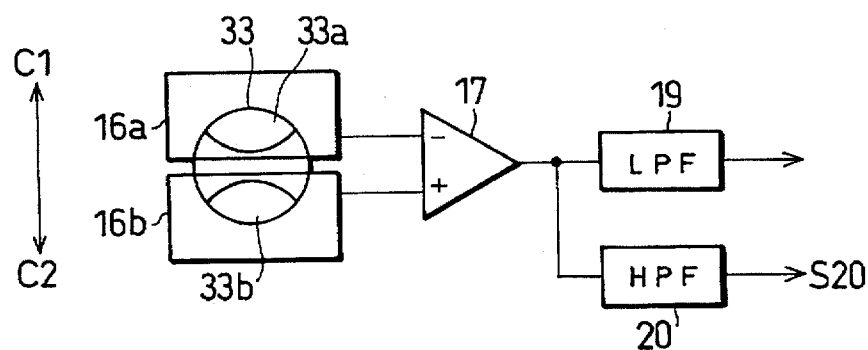
FIGS. 11(a) and 11(b) are block diagrams showing an arrangement of a signal generating section including an optical sensor.
Figure 11B:
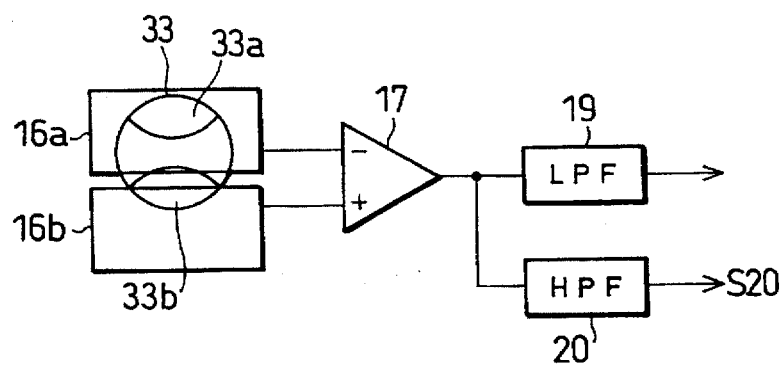

FIG. 11(a) illustrates an arrangement of main parts of a circuit for generating the first intermediate address signal. No sum signal is generated in the present embodiment. FIG. 11(b) illustrates the objective lens 14 displaced from the neutral position thereof. The neutral position of the objective lens 14 refers to the optical axis. As shown in FIG. 11(b), when the objective lens 14 moves in the direction denoted as A1 in FIG. 10, a diffraction pattern 33 moves in the direction denoted as C1 in FIG. 11(b). The amplitude of the first intermediate address signal, which is generated from a difference signal, decreases in accordance with the movement of the diffraction pattern 33.

Figure 12A:
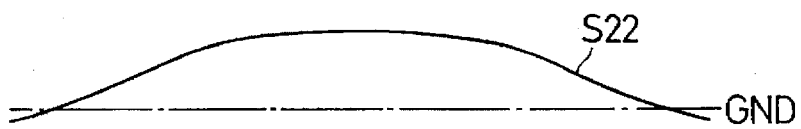
FIGS. 12(a) through 12(d) are explanatory drawings showing how an address signal is obtained.
Figure 12B:
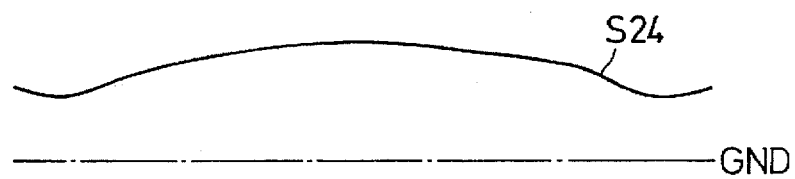
Figure 12C:
Figure 12D:
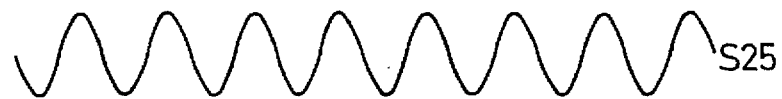
Figure 14:
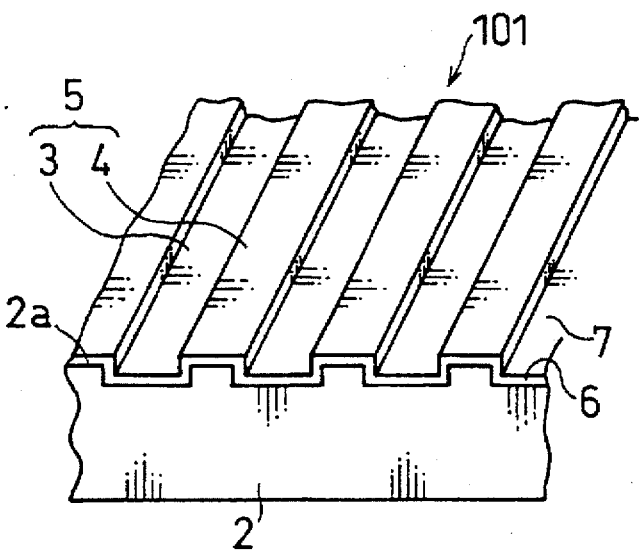
FIG. 14 is an enlarged view showing a main part of a conventional optical disk.

Next, the following description will discuss the generation of the amplified signal S25. The amplified signal S25 is generated by amplifying the first intermediate address signal S20 in accordance with the gain signal S24 generated in accordance with the objective lens position signal S22. FIGS. 12(a) through 12(d) illustrate this technique for generating address. FIG. 12(a) shows an outputted waveform of the objective lens position signal S22 obtained through the light sensor 43. FIG. 12(b) shows an outputted waveform of the gain signal S24. FIG. 12(c) shows an outputted waveform of the first intermediate address signal S20 outputted from the HPF 20. FIG. 12(d) shows an outputted waveform of the amplified signal S25 outputted from the gain variable amplifier 25.

The amplitude of the first intermediate address signal S20 decreases as the objective lens 14 shifts from the neutral position thereof. The objective lens position signal S22 changes as shown in FIG. 12(a) in accordance with the position of the objective lens 14. The gain generating circuit 24 calculates the absolute value of the amount of the displacement from the neutral position of the objective lens position signal S22, and set the gain signal S24 so that the greater the amount of the displacement from the neutral position is, the greater the gain is. The first intermediate address signal S20 is amplified by the gain variable amplifier 25 in accordance with the gain signal S24 to become the amplified signal S25 (FIG. 12(d)). The address generating circuit 26 then generates the address signal S26.

However, FIG. 12(b) shows only an example of the gain signal S24. Other types of the gain signal S24 are also possible. For example, an appropriate gain signal may be selected from a plurality of predetermined gain signals, instead of changing the gain signal S24 continuously. Alternatively, a conversion table may be provided to the gain generating circuit 24 in accordance with which the gain signal is calculated from the amount of the displacement from the neutral position. The conversion table is effective because the amount of the displacement from the neutral position is not in simple proportion to the change of the amplitude of the first intermediate address signal S20 outputted from the HPF 20. The conversion table may be of a type selectively adopting one of the predetermined gain signals step by step, as in the above case, in accordance with the range of the amount of the displacement from the neutral position, instead of changing the gain signal S24 continuously.

The neutral position of the objective lens position signal S22, which is a reference for the generation of the gain signal S24, varies depending upon, for example, inappropriate adjustment and changes with time of the position of the light sensor 43 for sensing the position of the objective lens. This is compensated for by monitoring the objective lens position signal S22 and a reproduced signal obtained through a reproduced signal sensing system (not shown), and applying an offset to the objective lens position signal S22 so that the position producing the maximum level of the reproduced signal represents the neutral position. Alternatively, this is compensated for by calculating a sum of the signals outputted from the two light receiving sections 16a and 16b of the light sensor 16, monitoring the sum signal and the objective lens position signal S22, and applying an offset to the objective lens position signal S22 so that the position producing the maximum level of the sum signal represents the neutral position.

FIGS. 13(a) through 13(d) illustrate an address signal generating operation when there is a change in the reflectance of a disk 1. FIG. 13(a) shows an outputted waveform of the objective lens position signal S22 obtained through the light sensor 43. FIG. 13(b) shows an outputted waveform of the gain signal S24. FIG. 13(c) shows an outputted waveform of the first intermediate address signal S20 outputted from the HPF 20. FIG. 13(d) shows an outputted waveform of the amplified signal S25 outputted from the gain variable amplifier 25. Assume that the reflectance decrease occurs in areas denoted as I and J in FIG. 13(a).

In the present embodiment, the first intermediate address signal S20 is used to generate the address signal S26. Since the first intermediate address signal S20 is a difference signal, there is little affection by a possible reflectance change. Especially, in a case where the objective lens 14 is in a neighborhood of the neutral position (e.g., the objective lens 14 is in the area I), since the gain signal S24 is small, and the amplified signal S25 is outputted in almost the same waveform as the first intermediate address signal S20, there is very little affection by the reflectance change. On the other hand, in a case where the objective lens 14 is greatly displaced from the neutral position (e.g., the objective lens 14 is in the area J), since the gain signal S24 is great, and signal distortion of the first intermediate address signal S20 is enlarged and outputted by the amplified signal S25, there is some affection by the reflectance change. But, this does not matter much because it is highly unlikely that the objective lens 14 shifts greatly and that the reflectance change, such as in the area J, occurs at the same time.

As noted above, in the present embodiment, the amplitude of the amplified signal S25 is almost constant. Therefore, there is little affection by the displacement of the objective lens 14 from the neutral position thereof, fewer errors in the address signal S26, and little affection by the reflectance change of the optical disk 1.

The above arrangement of the objective lens position sensing means is not the only possible arrangement. The objective lens position sensing means may be arranged in various other ways as discussed in the second embodiment.

In the present embodiment, only one of the side-walls 3a and 3b of the groove 3 of the optical disk 1 is wobbling as shown in FIGS. 2(a) and 2(b). However, the present embodiment is also effective with an optical disk having a groove, the whole of which wobbles in accordance with the address information, such as a write-once-type compact disc (CD-R) and a rewritable mini disc (MD). In this case, the groove is provided to be wider than the land, and only the groove is used to record, reproduce and erase information.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. An optical disk device, comprising:

an optical pickup, said optical pickup including:

radiating means for radiating a light beam as a light spot for recording/reproducing information onto an optical disk where only one of the side-walls of a spiral tracking groove wobbles in accordance with address information;

an objective lens for converging the light beam onto the optical disk; and a light sensor, divided into two parts by a dividing line whose direction coincides to a direction of the groove, for receiving light reflected by the optical disk;

first intermediate address generating means for generating a first intermediate address signal from the wobbling of the side-wall of the groove by using a difference signal of outputs of said light sensor divided into the two parts;

second intermediate address generating means for generating a second intermediate address signal from the wobbling of the side-wall of the groove by using a sum signal of outputs of said light sensor divided into the two parts; and address generating means for generating an address signal representative of the address information by using the first and second intermediate address signals.

2. The optical disk device as defined in claim 1, further comprising:

control means for moving said optical pickup in an orthogonal direction to a track of the optical disk in accordance with the address signal.

3. The optical disk device as defined in claim 1, wherein said address generating means includes:

error sensing means for sensing readout errors in the first intermediate address signal and readout errors in the second intermediate address signal; and signal selecting means for selecting one of the first and second intermediate address signals in accordance with results of sensing by said error sensing means.

4. The optical disk device as defined in claim 3, wherein said signal selecting means selects, between the first and second intermediate address signals, an intermediate address signal whose errors, sensed by said error sensing means, occur less frequently than a predetermined value.

5. The optical disk device as defined in claim 1, wherein said address generating means includes:

amplitude sensing means for sensing a signal amplitude/signal amplitudes of at least one of the first and second intermediate address signals; and signal selecting means for selecting one of the first and second intermediate address signals in accordance with results of sensing by said amplitude sensing means.

6. The optical disk device as defined in claim 5, wherein said signal selecting means selects, between the first and second intermediate address signals, an intermediate address signal whose amplitude, sensed by said amplitude sensing means, is greater than a predetermined value.

7. The optical disk device as defined in claim 1, wherein said address generating means includes:

error correcting means for correcting errors in the first intermediate address signal and for correcting errors in the second intermediate address signal; and signal selecting means for selecting, between the first and second intermediate address signals, an intermediate address signal whose errors can be corrected by said error correcting means.

8. The optical disk device as defined in claim 1, further comprising:

objective lens position sensing means for sensing an amount of displacement of said objective lens from an optical axis of the light beam in a tracking direction, wherein said address generating means generates an address signal representative of the address information from the first intermediate address signal when the amount of the displacement of said objective lens is smaller than a predetermined value, and generates an address signal representative of the address information from the second intermediate address signal when the amount of the displacement of said objective lens is greater than the predetermined value.

9. The optical disk device as defined in claim 8, wherein said objective lens position sensing means includes:

a lens movable section, having an aperture, for moving said objective lens parallelly to the optical disk;

a light emitting element for radiating light through the aperture;

a light sensor for sensing a position of said objective lens by receiving, at two light receiving sections, light and said light emitting element and passing through the aperture of said lens movable section; and a differential amplifier, connected to the light receiving sections, for outputting an objective lens position signal representative of a position of said objective lens.

10. The optical disk device as defined in claim 1, further comprising:

inverting means for inverting at least one of the first and second intermediate address signals.

11. The optical disk device as defined in claim 10, wherein said inverting means makes a phase of the first intermediate address signal and a phase of the second intermediate address signal coincide with each other.

12. The optical disk device as defined in claim 10, wherein said inverting means inverts the first intermediate address signal by inverting a polarity of a tracking error signal.

* * * * *